(12) United States Patent
Ushigome

(10) Patent No.: US 8,064,134 B2
(45) Date of Patent: Nov. 22, 2011

(54) OPTICAL ELEMENT AND IMAGE PROJECTION APPARATUS

(75) Inventor: Reona Ushigome, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1195 days.

(21) Appl. No.: 11/763,037

(22) Filed: Jun. 14, 2007

(65) Prior Publication Data
US 2007/0291359 A1   Dec. 20, 2007

(30) Foreign Application Priority Data

Jun. 16, 2006   (JP) ................................. 2006-168106
Jun. 6, 2007   (JP) ................................. 2007-150000

(51) Int. Cl.
*G02B 5/30*   (2006.01)
(52) U.S. Cl. ................................. 359/485.03
(58) Field of Classification Search .................. None
See application file for complete search history.

(56) References Cited

U.S. PATENT DOCUMENTS

| | | | |
|---|---|---|---|
| 6,626,540 B2 | 9/2003 | Ouchi et al. | |
| 6,840,626 B2 | 1/2005 | Ikeda et al. | |
| 6,926,411 B2 | 8/2005 | Ouchi et al. | |
| 7,044,607 B2 | 5/2006 | Ouchi et al. | |
| 2001/0021004 A1* | 9/2001 | Yano | 353/31 |

FOREIGN PATENT DOCUMENTS

| | | |
|---|---|---|
| JP | 2001-154152 | 6/2001 |
| JP | 2002-162520 | 6/2002 |

OTHER PUBLICATIONS

L. Li and J.A. Dobrowolski., High-performance thin-film polarizing beam splitter operating at angles greater than the critical angle, Applied Optics, Jun. 1, 2000, pp. 2754-2771, vol. 39, No 16.

* cited by examiner

*Primary Examiner* — Stephone B. Allen
*Assistant Examiner* — Derek S Chapel
(74) *Attorney, Agent, or Firm* — Rossi, Kimms & McDowell LLP

(57) ABSTRACT

An optical element is disclosed which includes a multilayer film having a light-transmission function for light in the entire wavelength range impinging thereon at a predetermined incident angle and a polarization splitting function for S-polarized light and P-polarized light impinging thereon at another incident angle. The optical element includes two entrance surfaces, one emergence surface, three transmissive surfaces each of which faces a reflective image-forming element, and first and second optical structures respectively formed along first and second planes intersecting each other. The all normals to the above surfaces and the first and second planes are parallel to a same plane. The optical element satisfies $45° < \theta 0 < 75°$, where $\theta 0$ is a smaller one of angles made by the first and second planes.

4 Claims, 19 Drawing Sheets

OPTICAL ELEMENT AND IMAGE PROJECTION APPARATUS

BACKGROUND OF THE INVENTION

The present invention relates to an optical element using in an image projection apparatus which includes a reflective image-forming element.

A so-called three-plate type reflective projector performs color separation of illumination light of a blue wavelength range, a green wavelength range, and a red wavelength range, and color combination of image light modulated by each of three reflective image-forming elements. Elements such as a dichroic element and a polarization beam splitter are therefore arranged between the reflective image-forming element and the projection lens.

In a known general three-plate type reflective projector, between one reflective image-forming element and a projection lens, at least two elements are provided which perform color separation or color combination and have a splitting film forming an angle of 45° with respect to the optical axis of an illumination optical system. In other words, in the projector, three or four elements including a dichroic element and a polarization beam splitter are arranged.

Such a projector using three reflective liquid crystal panels respectively corresponding to a blue wavelength light, a green wavelength light and a red wavelength light and performing color separation and color combination by the dichroic element and the polarization beam splitter has been disclosed in Japanese Patent Laid-Open No. 2001-154152.

Moreover, in Japanese Patent Laid-Open No. 2002-162520, a prism type element which performs color separation, polarization beam splitting, and color combination in one element has been disclosed. This prism type element has a configuration in which three wavelength-selective polarization splitting films are arranged in a cube. In the cube, three surfaces each of which forms an angle of 45° with respect to two surfaces contacting one of three sides gathering to one apex and includes the one side, are formed. In other words, three 45° surfaces passing one apex are formed. And desired wavelength-selective polarization splitting films are arranged along these 45° surfaces.

On the other hand, as an optical thin film such as a polarization splitting film, a multilayer film is used in many cases. Moreover, it is also known that utilizing the fact that P-polarized light is transmitted therethrough at Brewster's angle can provide a polarization splitting film with a wide polarization beam splitting wavelength range.

In 'Li Li and J. A. Dobrowolski, Appl. Opt., vol. 39, p. 2754, 2000' a polarization beam splitter which reflects P-polarized light and transmits S-polarized light has been disclosed. In the polarization beam splitter, light impinges at a large incident angle that is larger than a critical angle obtained from the refractive index of a prism and a low refractive-index thin film. In usual, although total reflection occurs and light is not transmitted through the thin film, since the film thickness of the low refractive-index thin film is equal to or smaller than the wavelength of the light, attenuated total reflection occurs and thereby light is transmitted through the thin film. Utilizing the attenuated total reflection can provide a polarization beam splitter which reflects P-polarized light, transmits S-polarized light, and has a wider incident angle range, a wider polarization beam splitting wavelength range and a higher extinction ratio, as compared to those of a common polarization beam splitter using Brewster's angle.

Moreover, in Japanese Patent Laid-open Nos. 2006-47903 and 2006-79058, a wavelength-selective polarization splitting film has been disclosed, which transmits S-polarized light and reflects P-polarized light in a specific wavelength range, and reflects S-polarized light and transmits P-polarized light in another specific wavelength range. In these documents, a multilayer polarization splitting film having a wavelength-selective function is obtained by utilizing attenuated total reflection and using a specific film configuration.

In a projector disclosed in Japanese Patent Laid-Open No. 2001-154152, first, illumination light is color-separated into light of two wavelength ranges (first and second wavelength lights) and light with one wavelength light (third wavelength light). After that, the first wavelength light and the second wavelength light are color-separated and color-combined, and finally, the first wavelength light, the second wavelength light and the third wavelength light are color-combined. Therefore, two elements for performing color separation or color combination are required in the optical path of one wavelength light. Therefore, in the whole projector, four elements are required, and thereby the configuration thereof becomes complicated. Moreover, the optical path length thereof becomes long, thus, in order to secure required amount of the luminous flux, each of the elements becomes also large. Furthermore, since the back focus of a projection lens becomes long, the projection lens itself becomes also large.

Moreover, in a prism type element disclosed in Japanese Patent Laid-Open No. 2002-162520, the first wavelength light, the second wavelength light and the third wavelength light are color-separated and color-combined by one element. However, there is a boundary line due to a beam splitting film in each of all optical path surfaces in the prism type element. Among them, a boundary line existing in an optical surface for a reflective liquid crystal panel largely influences images, and thereby each wavelength light from each of the panels becomes light being substantially in parallel with respect to another wavelength-selective polarization splitting film other than two wavelength-selective polarization splitting films acting as beam splitting films. Since the incident angle with respect to the wavelength-selective polarization splitting film of the light is large, the reflectance thereof for the light becomes high. As a result, a ghost is likely to occur.

On the other hand, a conventional optical thin film has a characteristic in which, depending on the incident angle of light, a light-transmission action appears strongly or a reflection action appears strongly. For example, in the polarization beam splitter using Brewster's angle, if the incident angle of P-polarized light deviates from the conditions of Brewster's angle, reflection will occur. Therefore, it has been difficult to obtain the light-transmission action by an incident angle different from Brewster's angle at which polarization beam splitting is performed.

The polarization beam splitter disclosed in 'Li Li and J. A. Dobrowolski, Appl. Opt., vol. 39, p. 2754, 2000' also does not have a function of causing light components in the entire visible wavelength range impinging on its polarization beam splitting surface at different incident angles to be transmitted therethrough.

Moreover, even the wavelength-selective polarization splitting films disclosed in Japanese Patent Laid-open Nos. 2006-47903 and 2006-79058, do not have a function of causing light components impinging thereon at different incident angles to be transmitted therethrough.

BRIEF SUMMARY OF THE INVENTION

The present invention provides an optical element including a multilayer film having a light-transmission function for light in the entire wavelength range which impinges thereon at a predetermined incident angle and a polarization splitting function for S-polarized light and P-polarized light which impinge thereon at another incident angle, and provides an image projection apparatus with the same.

As one aspect, the present invention provides an optical element including two entrance surfaces through each of which light enters the optical element, one emergence surface from which light emerges, three transmissive surfaces each of which faces a reflective image-forming element, and a first optical structure formed along a first plane and a second optical structure formed along a second plane, the first and second planes intersecting each other inside the optical element. The all normals to the two entrance surfaces, the one emergence surface, the three transmissive surfaces and the first and second planes are parallel to a same plane. Further, the following condition is satisfied:

$$45° < \theta0 < 75°$$

where θ0 is a smaller one of angles made by the first and second planes.

As another aspect, the present invention provides an optical element including a multilayer film. The multilayer film transmits light in an entire wavelength range impinging thereon at an incident angle of θ1 and separates light in the entire wavelength range impinging thereon at an incident angle of θ2 depending on the polarization state of the light. Further, the following condition is satisfied:

$$\theta2 - \theta1 > 30°.$$

As yet another aspect, the present invention provides an optical element including a multilayer film. The multilayer film transmits light in a first wavelength range impinging thereon at an incident angle of θ1, has a transmittance for P-polarized light in a second wavelength range impinging thereon at an incident angle of θ2, the transmittance being higher than a transmittance for S-polarized light in the second wavelength range impinging thereon at the incident angle of θ2. The multilayer film has a transmittance for S-polarized light in a third wavelength range different from the first and second wavelength ranges, the transmittance being higher than a transmittance for P-polarized light in the third wavelength range. Further, the following condition is satisfied:

$$\theta2 - \theta1 > 30°.$$

As still another aspect, the present invention provides an image projection apparatus including the above-described optical element which combines light from three reflective image-forming elements, and a projection system which projects light emerging from the optical element onto a projection surface.

Further features of the present invention will become apparent from the following description of exemplary embodiments with reference to the attached drawings.

DETAILED DESCRIPTION OF THE PREFERRED EMBODIMENTS

Hereinafter, with reference to drawings, preferable Embodiments of the present invention will be described.

Embodiment 1

Figure 1A:
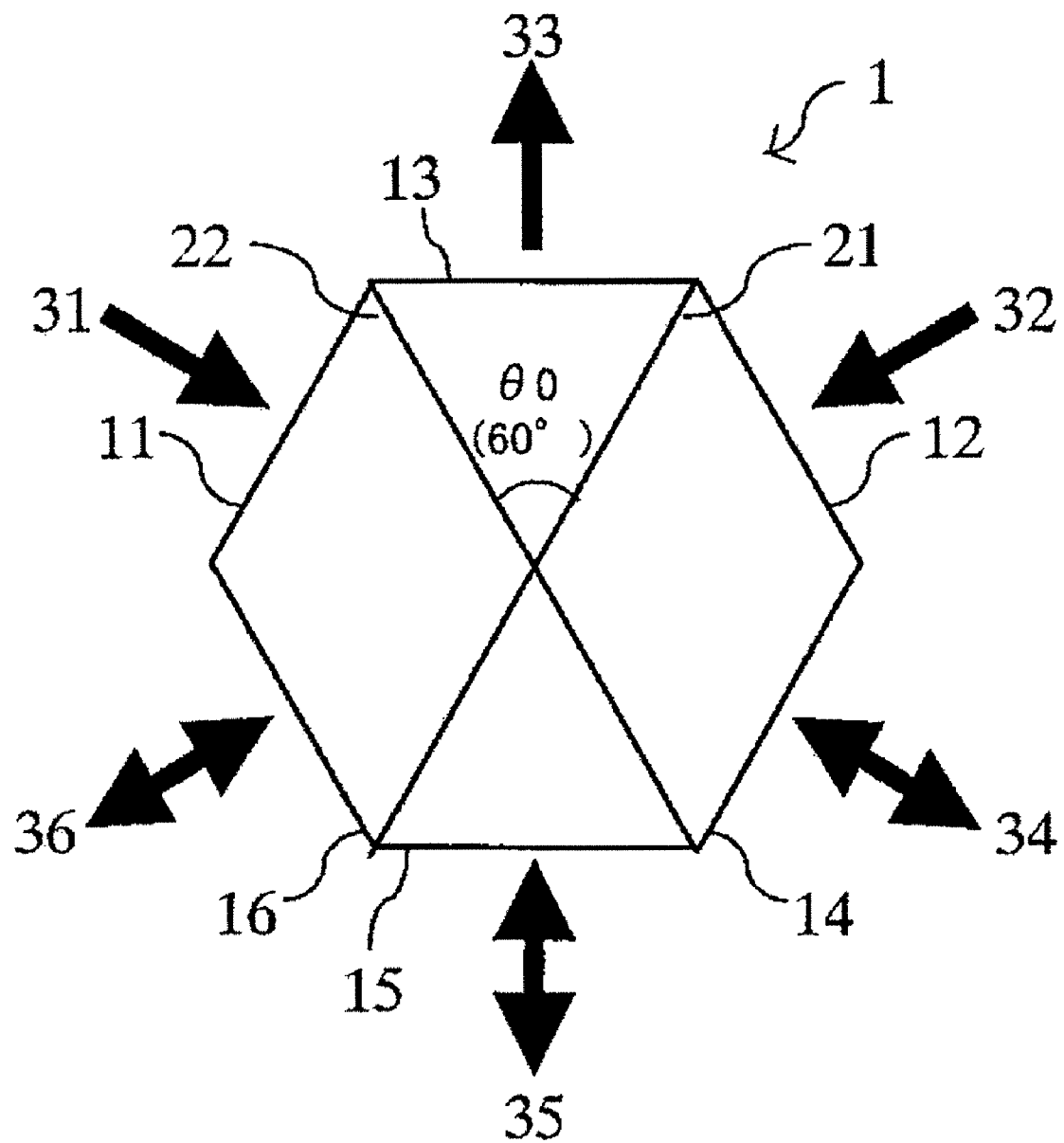
FIG. 1A is a schematic view of a color separating/combining prism that is Embodiment 1 of the present invention.

FIG. 1A shows an outline configuration of a color separating/combining prism 1 as an optical element that is Embodiment 1 of the present invention. The color separating/combining prism 1, as shown in FIG. 1B, has a shape where, in a three dimensional shape defined as a hexagonal pillar (virtual hexagonal pillar) whose all internal angles 1A are greater than 90°, six optical surfaces 11 to 16 are arranged on six planes (side planes) except for both hexagonal end planes (the upper and lower planes in the figure).

Figure 1B:
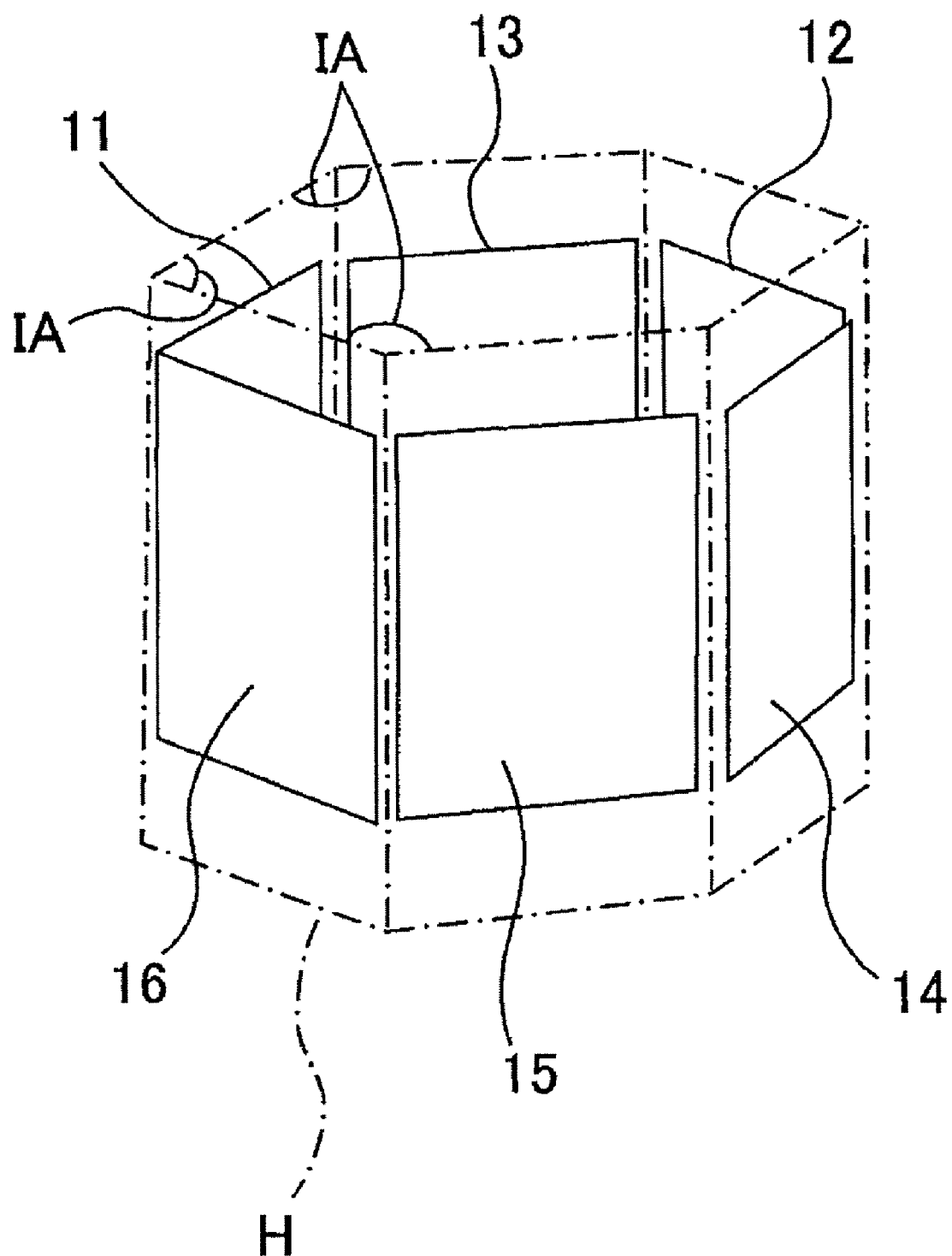
FIG. 1B is a view describing optical surface arrangement of the color separating/combining prism of Embodiment 1.

FIG. 1A shows a shape of the color separating/combining prism 1 viewed from the upper side or the lower side of FIG. 1B. Each of the upper and lower planes of the virtual hexagonal pillar has a shape of an equilateral hexagon, and opposite sides of each of the upper and lower planes of the virtual hexagonal pillar are parallel to each other.

The optical surface 11 is a first entrance surface for light 31 from an unshown light source, the optical surface 12 is a second entrance surface for light 32 from an unshown light source, and the optical surface 13 is an emergence surface for light 33. The optical surfaces 14, 15 and 16 are three transmissive surfaces (hereinafter referred to as entrance/emergence surfaces) for light 34, light 35 and light 36, respectively, as aperture portions (aperture surfaces) facing to reflective liquid crystal panels (44 to 46 in FIG. 2).

The first and second entrance surfaces 11 and 12 are arranged so as to neighbor the emergence surface 13. Moreover, the three entrance/emergence surfaces opposite to the first and second entrance surfaces 11, 12 and the emergence surface 13 are a first entrance/emergence surface 14, a third entrance/emergence surface 16 and a second entrance/emergence surface 15, respectively.

Inside the color separating/combining prism 1, a first multilayer film (a first optical structure) 21 and a second multilayer film (a second optical structure) 22 are respectively formed along two planes (first and second planes) which intersect with each other. The following description will be made by regarding that the first and second planes respectively coincide with the first and second multilayer films 21 and 22. For example, an angle made by the first and second multilayer films 21 and 22 and surface normals to the first and second multilayer films 21 and 22 are synonymous with an angle made by the first and second planes and the normals to the first and second planes, respectively. In addition, an angle made by the first and second planes (that is, an angle made by the first and second multilayer films) is synonymous with the angle made by the normal to the first plane and the normal to the second plane (that is, an angle made by the surface normal to the first multilayer film and the surface normal to the second multilayer film).

The first multilayer film 21 is formed so as to extend from the side between the second entrance surface 12 and the emergence surface 13 to the side between the second and third entrance/emergence surfaces 15 and 16. Moreover, the second multilayer film 22 is formed so as to extend from the side between the first entrance surface 11 and the emergence surface 13 to the side between the first and second entrance/emergence surfaces 14 and 15.

Both of the first multilayer film 21 and the second multilayer film 22 have a light-transmission function (antireflection function) of transmitting light impinging thereon at an incident angle of 0°, and a polarization splitting function of transmitting S-polarized light impinging thereon at an incident angle of 60° and reflects P-polarized light impinging thereon at an incident angle of 60°. In other words, the first and second multilayer films 21 and 22 have the same optical characteristics with regard to the above functions. The relationships between the multilayer films 21 and 22 and the six optical surfaces 11 to 16 are as follows.

An angle made by the normal to the first entrance surface 11 and the surface normal to the first multilayer film 21 is 0°, and an angle made by the normal to the first entrance surface 11 and the surface normal to the second multilayer film 22 is 60°. Moreover, an angle made by the normal to the second entrance surface 12 and the surface normal to the first multilayer film 21 is 60°, and an angle made by the normal to the second entrance surface 12 and the surface normal to the second multilayer film 22 is 0°.

Further, an angle θ0 made by the first multilayer film 21 and the second multilayer film 22 is 60°. In addition, any of the angles is smaller than angles made by the surface normals or the multilayer films. Moreover, all normals to the first and second entrance surfaces, the emergence surface, the first, second and third entrance/emergence surfaces, and the first and second planes, are in parallel with the paper plane (the same plane) in FIG. 1A.

In particular, in an optical path through which light entering the color separating/combining prism 1 passes until emerging therefrom, all normals to the optical surfaces which separate, combine, and reflect light, are in parallel with the paper plane (the same plane) in FIG. 1A. These are also applied to the following embodiments.

Figure 2A:
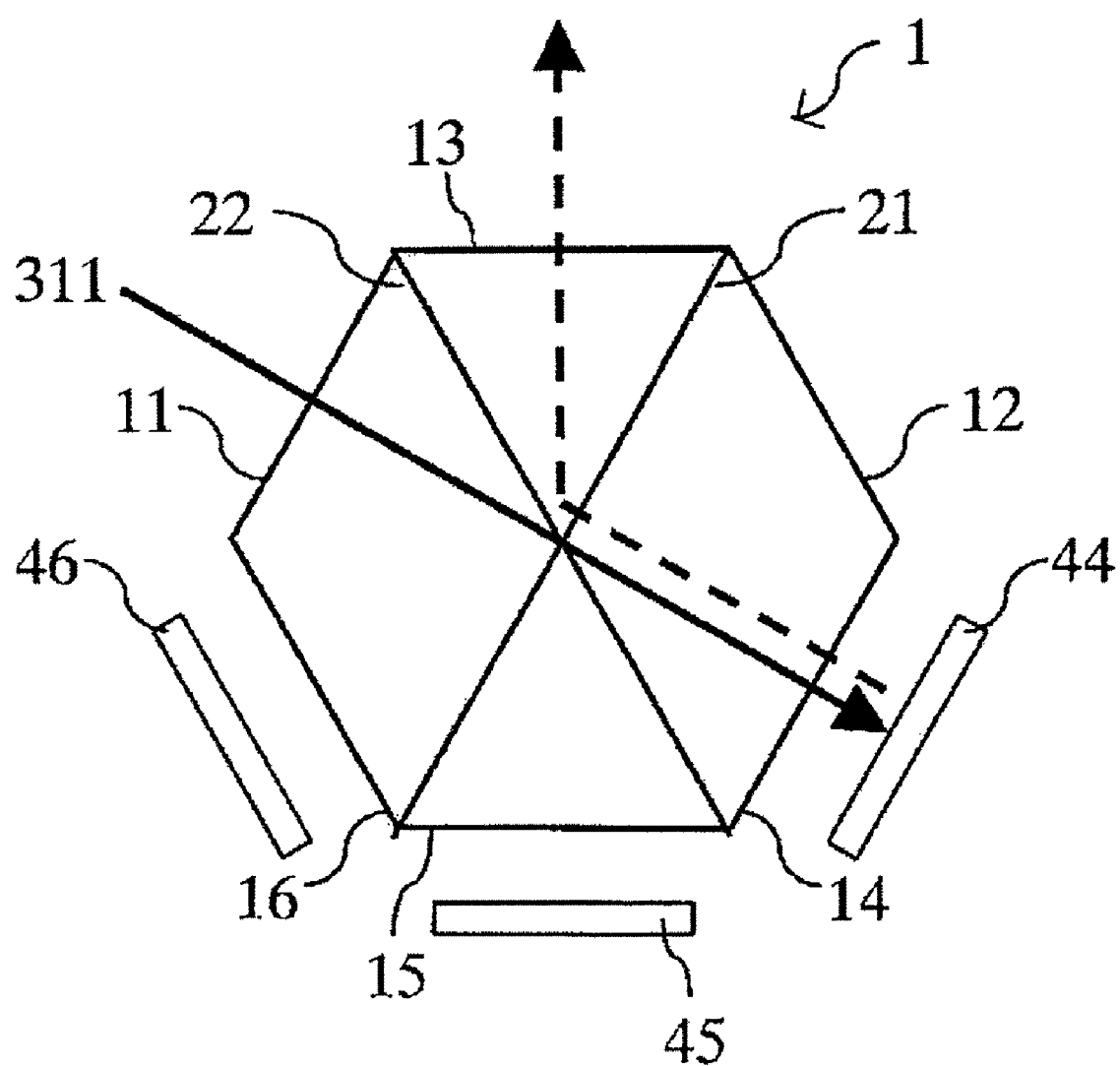
FIG. 2A is a view showing a basic optical action of the color separating/combining prism of Embodiment 1 for blue ray.
Figure 2B:
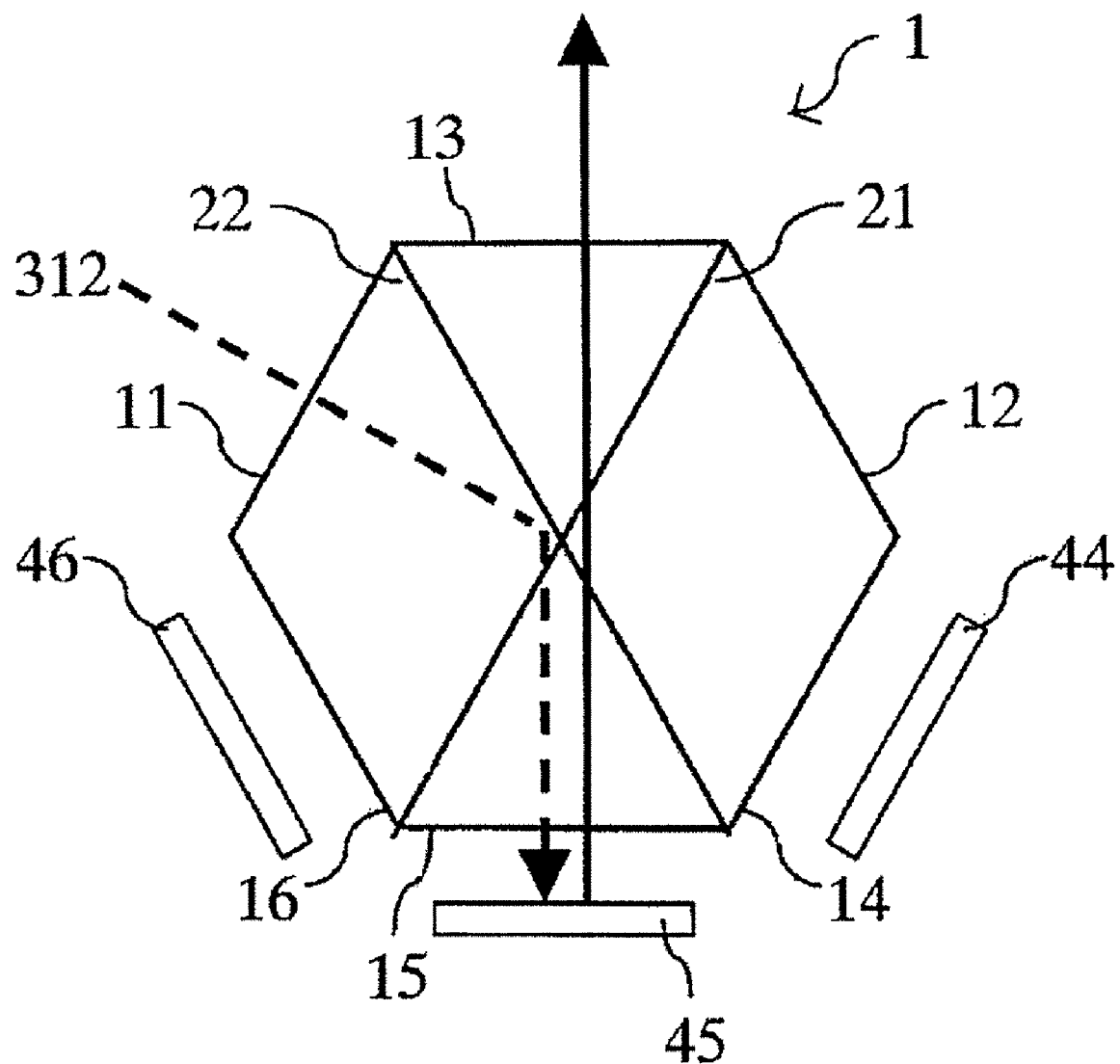
FIG. 2B is a view showing a basic optical action of the color separating/combining prism of Embodiment 1 for red ray.
Figure 2C:
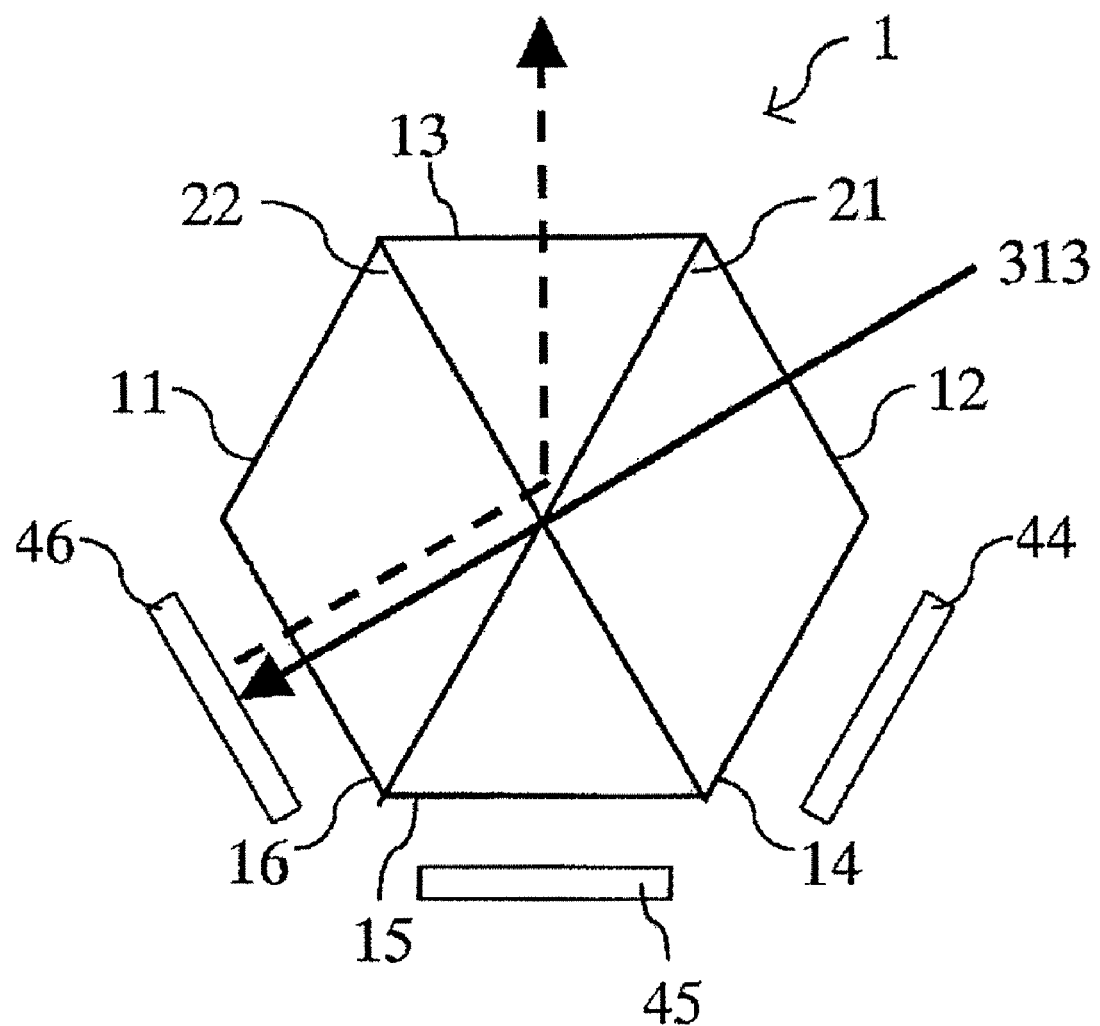
FIG. 2C is a view showing a basic optical action of the color separating/combining prism of Embodiment 1 for a green ray.

FIGS. 2A to 2C show basic optical actions of the color separating/combining prism 1 of this embodiment. FIG. 2A shows an optical path when a blue wavelength light (hereinafter, simply, referred to as a blue ray) 311 introduced from the light source enters the color separating/combining prism 1 from the first entrance surface 11 thereof as S-polarized light. In FIGS. 2A to 2C, a solid line indicates S-polarized light, and a dashed line indicates P-polarized light. S-polarized light and P-polarized light are different in polarization states.

The blue ray 311 entering the color separating/combining prism 1 impinges on the first multilayer film 21 at an incident angle of 0° to be transmitted therethrough, and then impinges on the second multilayer film 22 at an incident angle of 60° to be transmitted therethrough.

Moreover, in some incident positions thereof, the blue ray 311 impinges on the second multilayer film 22 at an incident angle of 60° to be transmitted therethrough, and then impinges on the first multilayer film 21 at an incident angle of 0° to be transmitted therethrough.

In this way, even when the blue ray 311 impinges at any position of the multilayer films 21 and 22 it is transmitted through the first and second multilayer films 21 and 22, and emerges outside the color separating/combining prism 1 from the first entrance/emergence surface 14 that is opposite to the first entrance surface 11.

Then, the blue ray 311 enters a reflective liquid crystal panel (hereinafter, simply referred to as a blue panel) 44 for a blue wavelength range.

The blue ray 311 reflected by the blue panel 44 and subjected to image modulation re-enters the color separating/combining prism 1 from the first entrance/emergence surface 14 thereof as P-polarized light. The blue ray 311 re-entering the color separating/combining prism 1 impinges on the first multilayer film 21 at an incident angle of 0° to be transmitted therethrough, and then impinges on the second multilayer film 22 at an incident angle of 60° to be reflected thereby.

Moreover, in some incident positions thereof, the blue ray 311 impinges on the second multilayer film 22 at an incident angle of 60°, is reflected thereby, and then impinges on the first multilayer film 21 at an incident angle of 60° to be transmitted therethrough.

In this way, even when the blue ray 311 re-entering the color separating/combining prism 1 impinges at any position of the multilayer films 21 and 22, the blue ray 311 is transmitted through the first multilayer film 21 and is reflected by the second multilayer film 22.

Then, the blue ray 311 emerges outside the color separating/combining prism 1 from the emergence surface 13 thereof, and proceeds to a projection lens (not shown).

FIG. 2B shows an optical path when a red wavelength light (hereinafter, simply referred to as a red ray) 312 introduced from the light source enters the color separating/combining prism 1 from the first entrance surface 11 thereof as P-polarized light. The red ray 312 entering the color separating/combining prism 1 impinges on the first multilayer film 21 at an incident angle of 0° to be transmitted therethrough, and then impinges on the second multilayer film 22 at an incident angle of 60°, and is reflected thereby.

Moreover, in some incident positions thereof, the red ray 312 impinges on the second multilayer film 22 at an incident angle of 60°, is reflected thereby, and then impinges on the first multilayer film 21 at an incident angle of 60° to be transmitted therethrough.

In this way, even when the red ray 312 impinges at any position of the multilayer films 21 and 22, the red ray 312 is transmitted through the first multilayer film 21 and is reflected by the second multilayer film 22.

Then, the red ray 312 emerges outside the color separating/combining prism 1 from the second entrance/emergence surface 15 thereof, and enters a reflective liquid crystal panel (hereinafter, simply referred to as a red panel) 45 for a red wavelength range.

The red ray 312 reflected by the red panel 45 and subjected to image modulation re-enters the color separating/combining prism 1 from the second entrance/emergence surface 15 thereof as S-polarized light. The red ray 312 re-entering the color separating/combining prism 1 impinges on the first multilayer film 21 at an incident angle of 60° to be transmitted therethrough, and then impinges on the second multilayer film 22 at an incident angle of 60° to be transmitted therethrough.

Moreover, in some incident positions thereof, the red ray 312 impinges on the second multilayer film 22 at an incident angle of 60° to be transmitted therethrough, and then impinges on the first multilayer film 21 at an incident angle of 60° to be transmitted therethrough.

In this way, even when the red ray 312 re-entering the color separating/combining prism 1 impinges at any position of the multilayer films 21 and 22, the red ray 312 is transmitted through the first and second multilayer films 21 and 22.

Then, the red ray 312 emerges outside the color separating/combining prism 1 from the emergence surface 13 thereof that is opposite to the second entrance/emergence surface 15, and proceeds to the projection lens.

FIG. 2C shows an optical path when a green wavelength light (hereinafter, simply referred to as a green ray) 313 introduced from the light source enters the color separating/combining prism 1 from the second entrance surface 12 thereof as S-polarized light. The green ray 313 entering the color separating/combining prism 1 impinges on the first multilayer film 21 at an incident angle of 60° to be transmitted therethrough, and then impinges on the second multilayer film 22 at an incident angle of 0° to be transmitted therethrough.

Moreover, in some incident positions thereof, the green ray 313 impinges on the second multilayer film 22 at an incident angle of 0° to be transmitted therethrough, and then impinges on the first multilayer film 21 at an incident angle of 60° to be transmitted therethrough.

In this way, even when the green ray 313 impinges at any position of the multilayer films 21 and 22, the green ray 313 is transmitted through the first and second multilayer films 21 and 22.

Then, the green ray 313 emerges outside the color separating/combining prism 1 from the third entrance/emergence surface 16 thereof that is opposite to the second entrance surface 12, and enters a reflective liquid crystal panel (hereinafter, simply referred to as a green panel) 46 for a green wavelength range.

The green ray 313 reflected by the green panel 46 and subjected to image modulation re-enters the color separating/combining prism 1 from the third entrance/emergence surface 16 thereof as P-polarized light. The green ray 313 re-entering the color separating/combining prism 1 impinges on the first multilayer film 21 at an incident angle of 60° to be reflected thereby, and then impinges on the second multilayer film 22 at an incident angle of 60° to be transmitted therethrough.

Moreover, in some incident positions thereof, the green ray 313 impinges on the second multilayer film 22 at an incident angle of 0° to be transmitted therethrough, and then impinges on the first multilayer film 21 at an incident angle of 60° to be reflected thereby.

In this way, even when the green ray 313 re-entering the prism 1 impinges at any position of the multilayer films 21 and 22, the green ray 313 is reflected by the first multilayer film 21 and transmitted through the second multilayer film 22.

Then, the green ray 313 emerges outside the color separating/combining prism 1 from the emergence surface 13 thereof, and proceeds to the projection lens.

As mentioned above, the color separating/combining prism 1 of this embodiment can perform optical path separation (color separation) of the blue, red and green rays 311 to 313 towards the blue, red and green panels 44 to 46, and color combination of the rays 311 to 313 from the three panels 44 to 46 in one prism.

In addition, an optical element of an alternative embodiment of the present invention can perform color separation and color combination using optical paths other than the optical path described above. In other words, the blue ray, the red ray and the green rays 311 to 313 described in FIGS. 2A to 2C may be interchanged.

Next, the first and second multilayer films 21 and 22 will be described in more detail. As mentioned above, both of the first and second multilayer films 21 and 22 have an antireflection function of transmitting a ray whose incident angle is 0°, and a polarization splitting function of transmitting S-polarized light whose incident angle is 60° and reflecting P-polarized light whose incident angle is 60°.

Generally, if light enters a low refractive-index medium from a high refractive-index medium at an incident angle equal to or greater than a critical angle, total reflection will occur. During the total reflection, an evanescent wave emerges out in a region whose size is an order of a wavelength. If another medium exists in the region in which the evanescent wave emerges out, light will be transmitted therethrough. This phenomenon is referred to as attenuated total reflection. Utilizing the attenuated total reflection can provide a polarization splitting film which has a wider range of incident angles, a wider polarization splitting wavelength and a higher extinction ratio than those of an general polarization splitting film using Brewster's angle and reflects P-polarized light and transmits S-polarized light.

In a multilayer film in which, on a prism base material (optical glass, etc.) with a refractive index nP, that is, on the surface of the prism base material, an optical thin film with a refractive index nH (hereinafter referred to as an H layer) and an optical thin film with a refractive index nL lower than nH (hereinafter referred to as an L layer) are alternately and repeatedly laminated, attenuated total reflection will occur. For this purpose, a greater incident angle θ2 of a ray to be subjected to polarization splitting than a critical angle obtained from the refractive indexes nP and nL is required, so that the following relationship is required to be satisfied:

$$\theta 2 > \sin^{-1}(nL/nP) \quad (1)$$

When SF6 (trade name of Schott Glass Technologies, Inc.; refractive index at a wavelength of 550 nm: 1.81) is used as a prism base material, $TiO_2$ (refractive index at a wavelength of 550 nm: 2.49) is used as the H layer, and $SiO_2$ (refractive index at a wavelength of 550 nm: 1.46) is used as the L layer, the critical angle is 53.8°. Since the incident angle of 60° of a ray to be subjected to polarization splitting is greater than the critical angle, attenuated total reflection occurs.

Furthermore, in order to make the color separating/combining prism 1 into a hexagonal pillar prism form, it is necessary to adhere (bond) another prism base material to the prism base material on which a multilayer film is formed. An adhesive material is generally utilized for this.

However, since the refractive index of an general adhesive material is an order of 1.5 to 1.6, total reflection will occur in an interface between the prism base material and the adhesive material. When the prism base material is SF6 and the refractive index of the adhesive material is 1.55, the critical angle is 58.9°. In other words, the incident angle of 60° of a ray to be subjected to polarization splitting is greater than the critical angle. Since it is difficult to make the adhesive material thin enough to cause attenuated total reflection to occur, total reflection occurs, thus, disabling to obtain a polarization splitting characteristic.

Therefore, the incident angle θ2 of the ray to be subjected to polarization splitting is required to be smaller than the critical angle obtained from the refractive index nP and the refractive index nB of the adhesive material, so that the following relationship is required to be satisfied:

$$\theta 2 < \sin^{-1}(nB/nP) \quad (2)$$

When SF6 is used as a prism base material and PVCz (refractive index at a wavelength of 550 nm: 1.7) having a high refractive index which is an ultraviolet curing resin is utilized as an adhesive material, the critical angle is 69.9°. Since the incident angle of 60° of the ray to be subjected to polarization splitting is smaller than the critical angle, total reflection does not occur.

However, the above-mentioned conditions (1) and (2) are not necessarily satisfied.

Figure 3A:
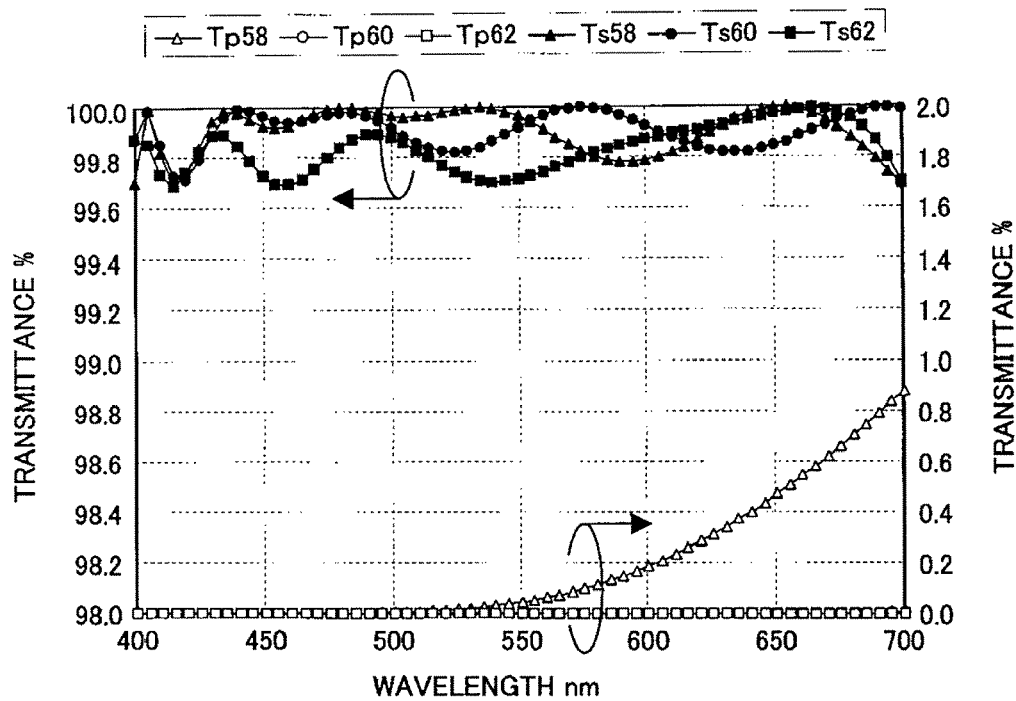
FIG. 3A is a view showing the characteristics of a multilayer film used for the color separating/combining prism of Embodiment 1.
Figure 3B:
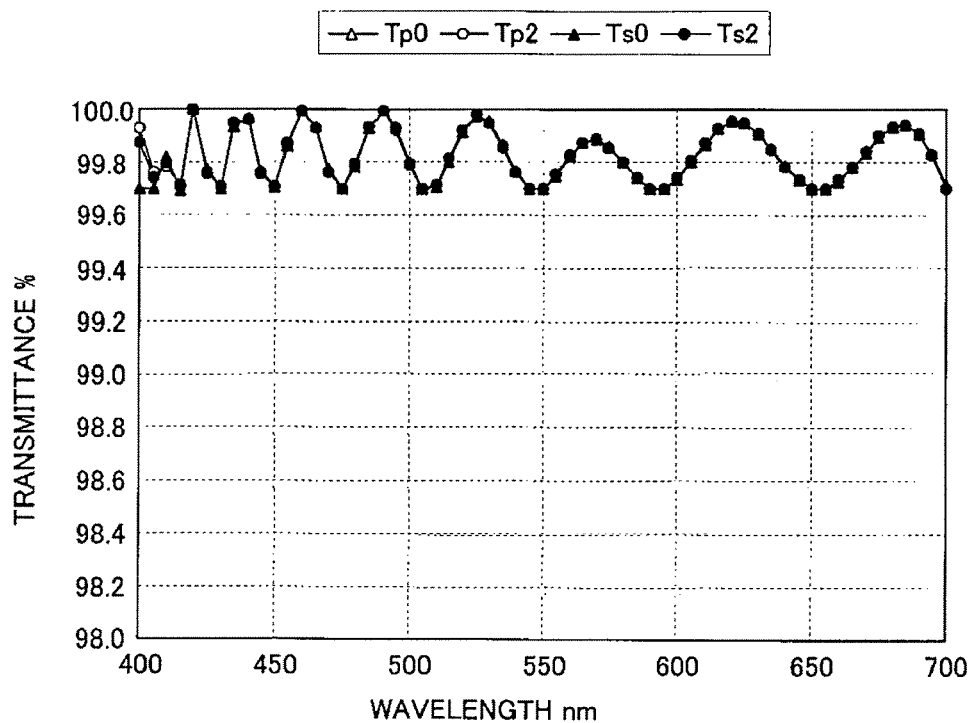
FIG. 3B is another view showing the characteristics of the multilayer film used for the color separating/combining prism of Embodiment 1.

From the above examination, designing of a film was performed by using SF6 as an entrance side medium being an prism base material, $TiO_2$ as an H layer, $SiO_2$ as an L layer, and PVCz as an emergence side medium being an adhesive material. The designed result of the film at that time is shown in FIGS. 3A and 3B, and the film configuration is given in Table 1. The number of layers is 37.

FIG. 3A is a view showing simulation results of the transmittances when P-polarized light and S-polarized light impinged on each multilayer film at incident angles of 60° and near 60°. Tp60, Tp58, and Tp62 show transmittances when P-polarized light impinged thereon at incident angles of 60°, 58°, and 62°, respectively. Moreover, Ts60, Ts58, and Ts62 show transmittances when S-polarized light impinged thereon at incident angles of 60°, 58°, and 62°, respectively.

In a projector, since impinging rays have angular distribution in many cases, transmittances in case of incident angles being 60° (reference angle) ±2° are also shown. In FIG. 3A, the left side vertical axis indicates transmittances for S-polarized light, and the right side vertical axis indicates transmittances for P-polarized light.

As understood from FIG. 3A, a polarization splitting characteristic with a high extinction ratio for an entire visible wavelength range is obtained. The extinction ratio means a ratio between the minimum intensity and the maximum intensity when the intensity of transmitting light is measured.

FIG. 3B is a view showing simulation results of the transmittances when P-polarized light and S-polarized light impinged on each multilayer film at incident angles of 0° and near 0°. Tp0 and Tp2 show transmittances when P-polarized light impinged thereon at incident angles of 0° and 2°, respectively. Moreover, Ts0 and Ts2 show transmittances when S-polarized light impinged thereon at incident angles of 0° and 2°, respectively.

From the reason mentioned above, a transmittance in case of an incident angle of +2° with respect to the incident angle of 0° that is a reference is also shown. Since a ray impinges on each of multilayer films vertically, Tp0 and Ts0 are completely identical. Moreover, since each multilayer film is insensible to the angular characteristic near the vertical incidence, significant difference between Tp2 and Ts2 is not seen. In FIG. 3B, a high transmittance characteristic for an entire visible wavelength range is also obtained.

As described above in this embodiment, utilizing attenuated total reflection can provide the multilayer films 21 and 22 (that is, a color separating/combining prism 1) which respectively have a high extinction ratio and a polarization splitting function of transmitting S-polarized light impinging thereon at an incident angle of 60° and reflecting P-polarized light impinging thereon at an incident angle of 60°. Further, the multilayer films 21 and 22 can be obtained which respectively have an antireflection function of transmitting a ray whose incident angle is 0°.

In addition, the material of the prism base material, the material of a thin film, the order of the thin films, the number of layers, and the film thicknesses given in Table 1 are mere examples, and embodiments of the present invention are not limited thereto. Moreover, although this embodiment described the case where PVCz was employed as an adhesive material, if total reflection did not occur in the interface between the prism base material and the adhesive material at a used incident angle, the adhesive material is not limited to the above-mentioned adhesive material. Furthermore, although 'optical contact' is known in which adhesion of a prism base material is performed without using an adhesive material, in embodiments of the present invention, occurrence of total reflection can also be avoided by using this.

In this embodiment, although the first multilayer film is formed on the first plane and the second multilayer film 22 is formed on the second plane, embodiments of the present invention are not limited thereto. For example, first SWS (an optical element which has a structural birefringence, an optical element which structurally has refractive-index anisotropy) may be formed on the first plane, and a second SWS may be formed on the second plane. This is also applied to the following embodiments.

Embodiment 2

Figure 4:
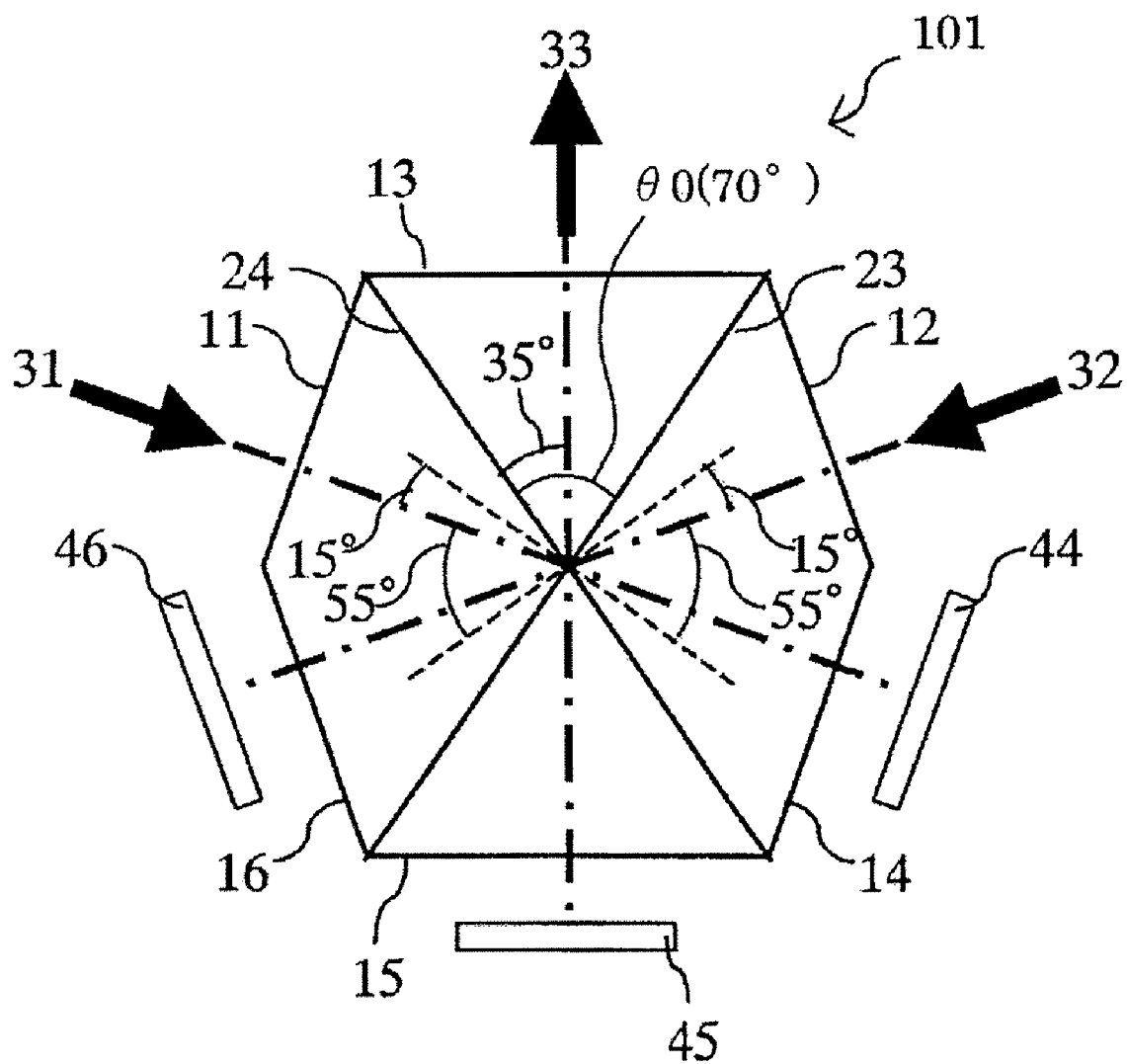
FIG. 4 is a schematic view of a color separating/combining prism that is Embodiment 2 of the present invention.

FIG. 4 shows an outline configuration of a color separating/combining prism 101 that is Embodiment 2 of the present invention. Similar to Embodiment 1, the base three dimensional shape thereof is also a virtual hexagonal pillar. However, though in Embodiment 1 the virtual hexagonal pillar is an equilateral hexagonal pillar, in this embodiment it is not an equilateral hexagonal pillar. Therefore, incident angles on the first and second multilayer films and film characteristics are different from those in Embodiment 1.

In the color separating/combining prism 101 of this embodiment, both of the first multilayer film 23 and the second multilayer film 24 have an antireflection function which transmits a ray whose incident angle is 15° and a polarization splitting function which transmits S-polarized light whose incident angle is 55° and reflects P-polarized light whose incident angle is 55°.

The relationships between the multilayer films 23 and 24 and the six optical surfaces 11 to 16 are as follows. An angle made by the normal to the first entrance surface 11 and the surface normal to the first multilayer film 23 is 15°, and an angle made by the normal to the first entrance surface 11 and the surface normal to the second multilayer film 24 is 55°. Moreover, an angle made by the normal to the second entrance surface 12 and the surface normal to the first multilayer film 23 is 55°, and an angle made by the normal to the second entrance surface 12 and the surface normal to the second multilayer film 24 is 15°. Moreover, an angle made by the first multilayer film 23 and the second multilayer film 24 is 70°.

The basic optical actions of the color separating/combining prism 101 of this embodiment for a blue ray, a green ray and a red ray are similar to those of Embodiment 1.

The first and second multilayer films 23 and 24, similar to those of Embodiment 1, transmit S-polarized light whose incident angle is 55° and reflect P-polarized light whose incident angle is 55° by utilizing attenuated total reflection. Further, they also have an antireflection function of transmitting a ray whose incident angle is 15°.

Figure 5A:
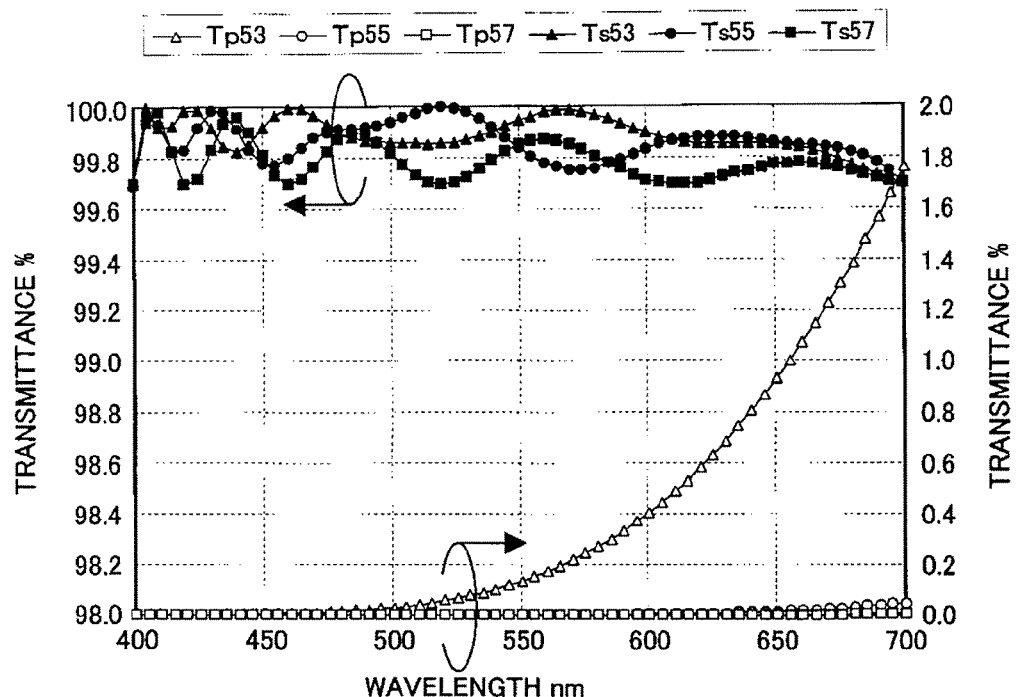
FIG. 5A is a view showing the characteristics of a multilayer film used for the color separating/combining prism of Embodiment 2.
Figure 5B:
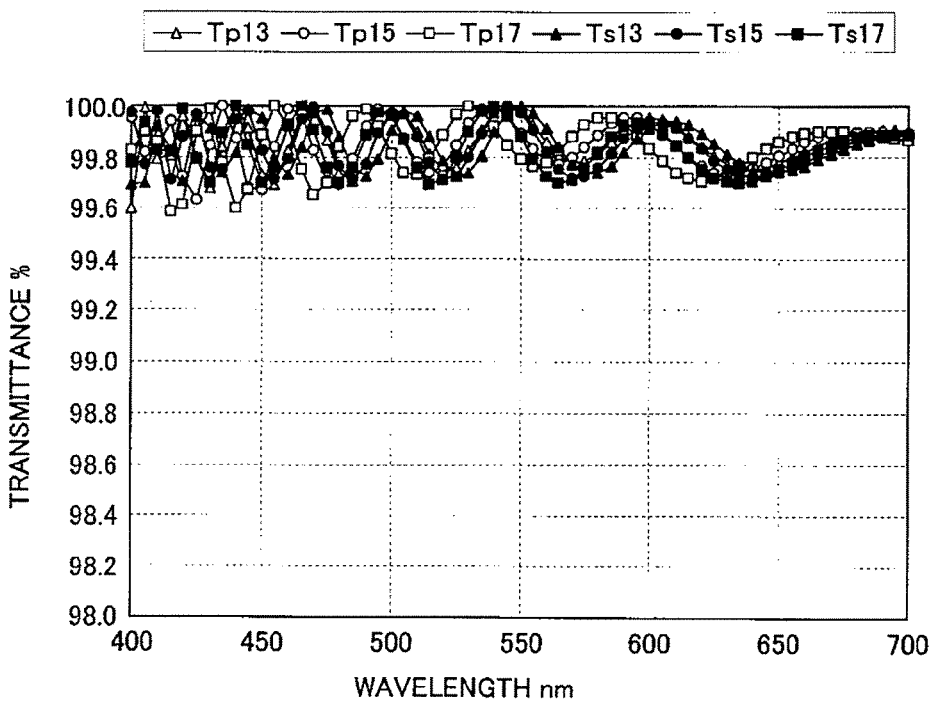
FIG. 5B is another view showing the characteristics of the multilayer film used for the color separating/combining prism of Embodiment 2.

In this embodiment, designing of a film was performed so as to satisfy such conditions. Specifically, SF6 was used as an entrance side medium being an prism base material, TiO2 was used as an H layer, SiO2 was used as an L layer, and PVCz was used as an emergence side medium being an adhesive material. The designed result of the film is shown in FIGS. 5A and 5B, and the film configuration is given in Table 1. The number of layers is 37.

FIG. 5A is a view showing simulation results of the transmittances when P-polarized light and S-polarized light impinged on each multilayer film at incident angles of 55° and near 55°. Tp55, Tp53, and Tp57 show transmittances when P-polarized light impinged thereon at incident angles of 55°, 53°, and 57°, respectively. Moreover, Ts55, Ts53, and Ts57 show transmittances when S-polarized light impinged thereon at incident angles of 55°, 53°, and 57°, respectively. The reason for also showing transmittances in case of incident angles being 55° (reference angle) ±2° is the same as that of Embodiment 1. In FIG. 5A, the left side vertical axis indicates transmittances for S-polarized light, and the right side vertical axis indicates transmittances for P-polarized light.

As understood from FIG. 5A, a polarization splitting characteristic with a high extinction ratio for an entire visible wavelength range is obtained.

FIG. 5B shows simulation results of the transmittances when P-polarized light and S-polarized light impinged on each multilayer film at incident angles of 15° and near 15°. Tp15, Tp13 and Tp17 show transmittances when P-polarized light impinged thereon at incident angles of 15°, 13° and 17°, respectively. Moreover, Ts15, Ts13 and Ts17 show transmittances when S-polarized light impinged thereon at incident angles of 15°, 13° and 17°, respectively. From the reason mentioned above, the transmittances in case of incident angles of ±2° with respect to the incident angle of 15° that is a reference are also shown. In FIG. 5B, a characteristic with a high transmittance for an entire visible wavelength range is also obtained.

As described above, in this embodiment, utilizing attenuated total reflection can provide the multilayer films 23 and 24, (that is, a color separating/combining prism 101), which respectively have a high extinction ratio and a polarization splitting function of transmitting S-polarized light whose incident angle is 55° and reflecting P-polarized light whose incident angle is 55°. Furthermore, the multilayer films 23 and 24 can be obtained which respectively have an antireflection function of transmitting a ray whose incident angle is 15°.

As mentioned above, even when using one prism whose base shape is not an equilateral hexagonal pillar, color separation and color combination can be performed. Accordingly, it is not necessary that the shape of the color separating/combining prism is an equilateral hexagonal pillar, thereby enabling to design a prism shape and a multilayer film corresponding to any incident angle.

Embodiment 3

Figure 6:
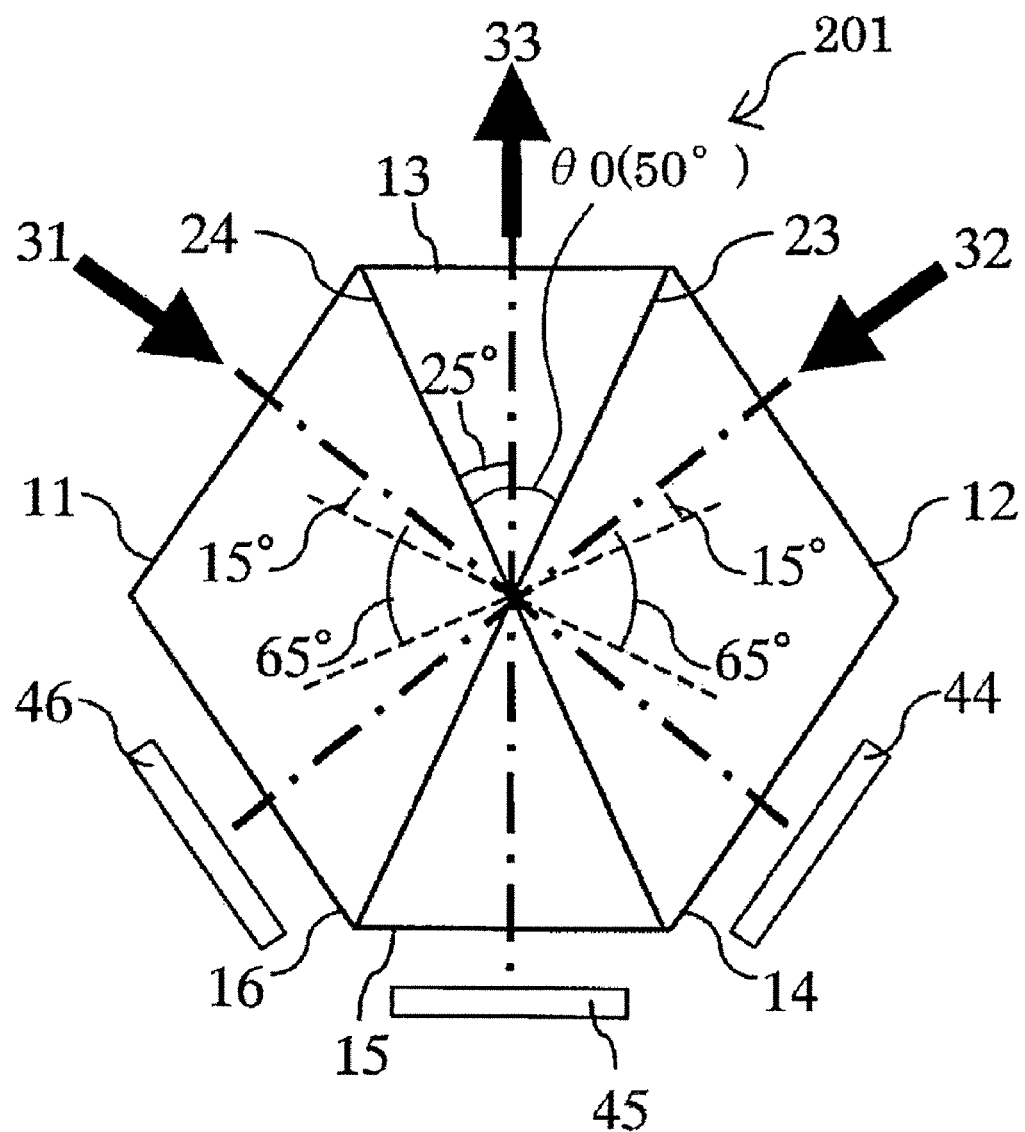
FIG. 6 is a schematic view of a color separating/combining prism that is Embodiment 3 of the present invention.

FIG. 6 shows an outline configuration of a color combining prism 201 according to Embodiment 3 of the present invention. Similar to Embodiment 1, the base three dimensional shape thereof is a virtual hexagonal pillar. However, though in Embodiment 1 the virtual hexagonal pillar is an equilateral hexagonal pillar, in this embodiment it is not an equilateral hexagonal pillar. Therefore, incident angles with respect to the first and second multilayer films and film characteristics are different from those in Embodiment 1.

In the color separating/combining prism 201 of this embodiment, both of the first multilayer film 23 and the second multilayer film 24 have an antireflection function which transmits a ray whose incident angle is 15°, a polarization splitting function which transmits S-polarized light whose incident angle is 65° and reflects P-polarized light whose incident angle is 65°.

The relationships between the multilayer films 23 and 24 and the six optical surfaces 11 to 16 are as follows. An angle made by the normal to the first entrance surface 11 and the surface normal to the first multilayer film 23 is 15°, and an angle made by the normal to the first entrance surface 11 and the surface normal to the second multilayer film 24 is 65°. Moreover, an angle made by the normal to the second entrance surface 12 and the surface normal to the first multilayer film 23 is 65°, and an angle made by the normal to the second entrance surface 12 and the surface normal to the second multilayer film 24 is 15°. Moreover, an angle made by the first multilayer film 23 and the second multilayer film 24 is 50°.

The basic optical actions of the color separating/combining prism 201 of this embodiment for a blue ray, a green ray and a red ray are similar to those of Embodiment 1.

The first and second multilayer films 23 and 24, similar to those of Embodiment 1, transmit S-polarized light whose incident angle is 65° and reflect P-polarized light whose incident angle is 65° by utilizing attenuated total reflection. Further, they also have an antireflection function of transmitting a ray whose incident angle is 15°.

Figure 7A:
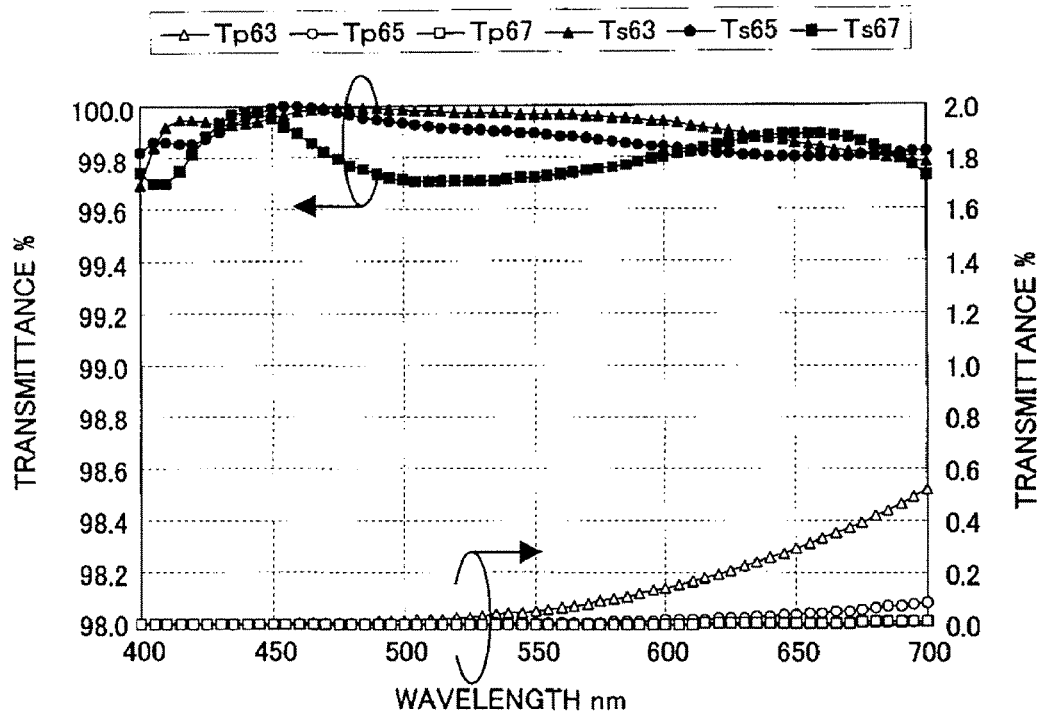
FIG. 7A is a view showing the characteristics of a multilayer film used for the color separating/combining prism of Embodiment 3.
Figure 7B:
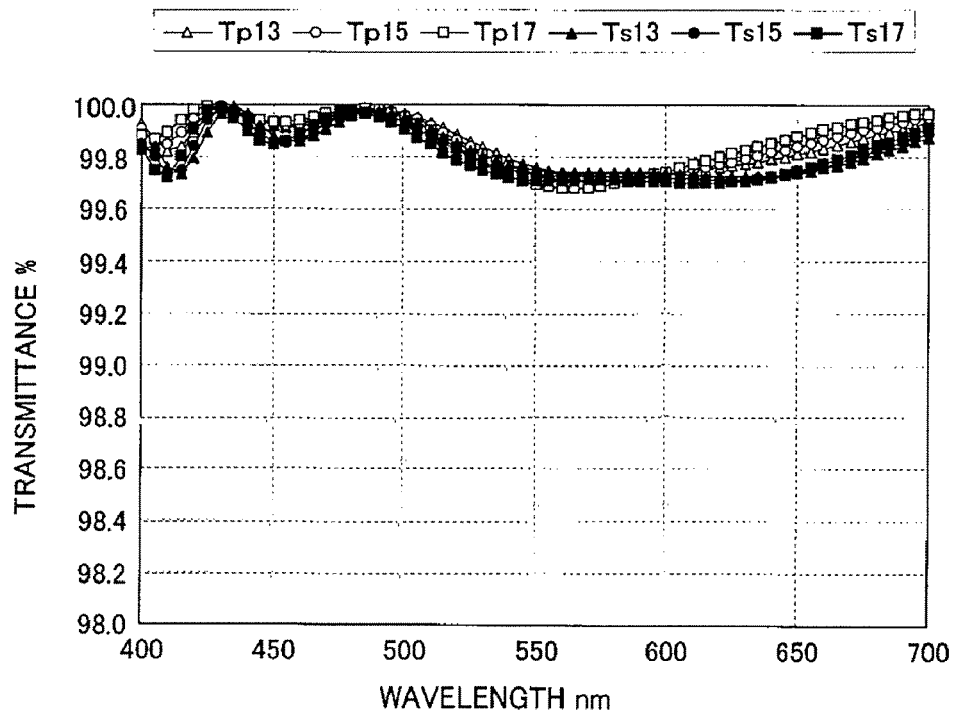
FIG. 7B is another view showing the characteristics of the multilayer film used for the color separating/combining prism of Embodiment 3.

In this embodiment, designing of a film was performed so as to satisfy such conditions. Specifically, SF6 was used as an entrance side medium being an prism base material, TiO2 was used as an H layer, SiO2 was used as an L layer, and PVCz was used as an emergence side medium being an adhesive material. The designed result of the film at that time is shown in FIGS. 7A and 7B, and the film configuration is given in Table 1. The number of layers is 25.

FIG. 7A shows simulation results of the transmittances when P-polarized light and S-polarized light impinged on each multilayer film at incident angles of 65° and near 65°. Tp65, Tp63, and Tp67 show transmittances when P-polarized light impinged thereon at incident angles of 65°, 63°, and 67°, respectively. Moreover, Ts65, Ts63, and Ts67 show transmittances when S-polarized light impinged thereon at incident angles of 65°, 63°, and 67°, respectively. The reason for showing also the transmittances in case of incident angles being 65° (reference angle) ±2° is the same as that of Embodiment 1. In FIG. 7A, the left side vertical axis indicates transmittances of S-polarized light, and the right side vertical axis indicates transmittances of P-polarized light.

As understood from FIG. 7A, a polarization splitting characteristic with a high extinction ratio for an entire visible wavelength range is obtained.

FIG. 7B shows simulation results of the transmittances when P-polarized light and S-polarized light impinged on each multilayer film at incident angles of 15° and near 15°. Tp15, Tp13 and Tp17 show transmittances when P-polarized light impinged thereon at incident angles of 15°, 13° and 17°, respectively. Moreover, Ts15, Ts13 and Ts17 show transmittances when S-polarized light impinged thereon at incident angles of 15°, 13° and 17°, respectively. From the reason mentioned above, the transmittances in case of incident angles of ±2° with respect to the incident angle of 15° that is a reference are also shown. In FIG. 7B, a characteristic with a high transmittance for an entire visible wavelength range is also obtained.

As described above, in this embodiment, utilizing attenuated total reflection can provide the multilayer films 23 and 24, (that is, a color separating/combining prism 201), which respectively have a high extinction ratio and a polarization splitting function of transmitting S-polarized light whose incident angle is 65° and reflecting P-polarized light whose incident angle is 65°.

Further, the multilayer films 23 and 24 can be obtained, which respectively have an antireflection function of transmitting a ray whose incident angle is 15°. Furthermore, a larger incident angle of a ray to be subjected to polarization splitting can reduce the number of layers of the multilayer film, which is preferable.

As mentioned above, even when using one prism whose base shape is not an equilateral hexagonal pillar, color separation and color combination can be performed. Accordingly, it is not necessary that the shape of the color separating/combining prism is an equilateral hexagonal pillar, thereby enabling to design a prism shape and a multilayer film corresponding to any incident angle.

Embodiment 4

Figure 8:
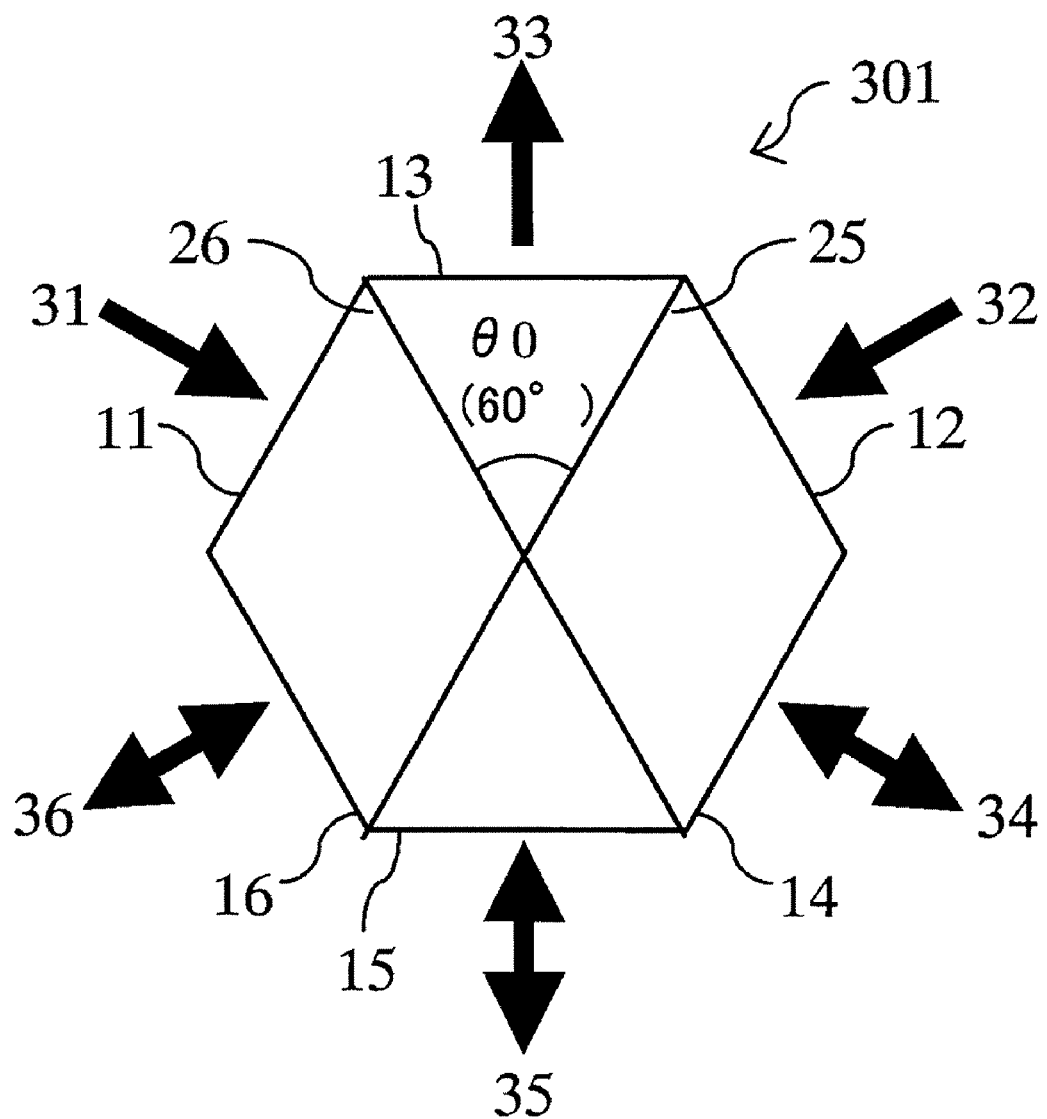
FIG. 8 is a schematic view of a projector that is Embodiment 4 of the present invention.

FIG. 8 shows an outline configuration of a color separating/combining prism 301 that is Embodiment 4 of the present invention. Similar to Embodiment 1, the base three dimensional shape thereof is a virtual hexagonal pillar. However, in this Embodiment 4 the first and second multilayer films have different optical functions whereas the first and second multilayer films have the same optical functions in Embodiments 1 to 3.

The first multilayer film 25 has for the entire visible region a light-transmission function (antireflection function) which transmits a ray impinging thereon at an incident angle of 0°, and a polarization splitting function which transmits S-polarized light impinging thereon at an incident angle of 60° and reflects P-polarized light impinging thereon at an incident angle of 60°. For the green wavelength region (or first wavelength region), the second multilayer film 26 has a light-transmission function (antireflection function) which transmits a light impinging thereon at an incident angle of 0°.

Further, for the blue wavelength region (or second wavelength region), the second multilayer film 26 has a polarization splitting function which transmits S-polarized light impinging thereon at an incident angle of 60° and reflects P-polarized light impinging thereon at an incident angle of 60°. Moreover, for the red wavelength region (or third wavelength region), the second multilayer film 26 has a polarization splitting function which reflects S-polarized light impinging thereon at an incident angle of 60° and transmits P-polarized light impinging thereon at an incident angle of 60°. The relationships between the multilayer films 25 and 26 and the six optical surfaces 11 to 16 are the same as those of Embodiment 1.

It is desirable that the first, second and third wavelength regions correspond to the green, blue and red wavelength regions, respectively, as above. However, the first, second and third wavelength regions are not limited thereto, that is, each may be any one of the green, blue and red wavelength regions.

Figure 9A:
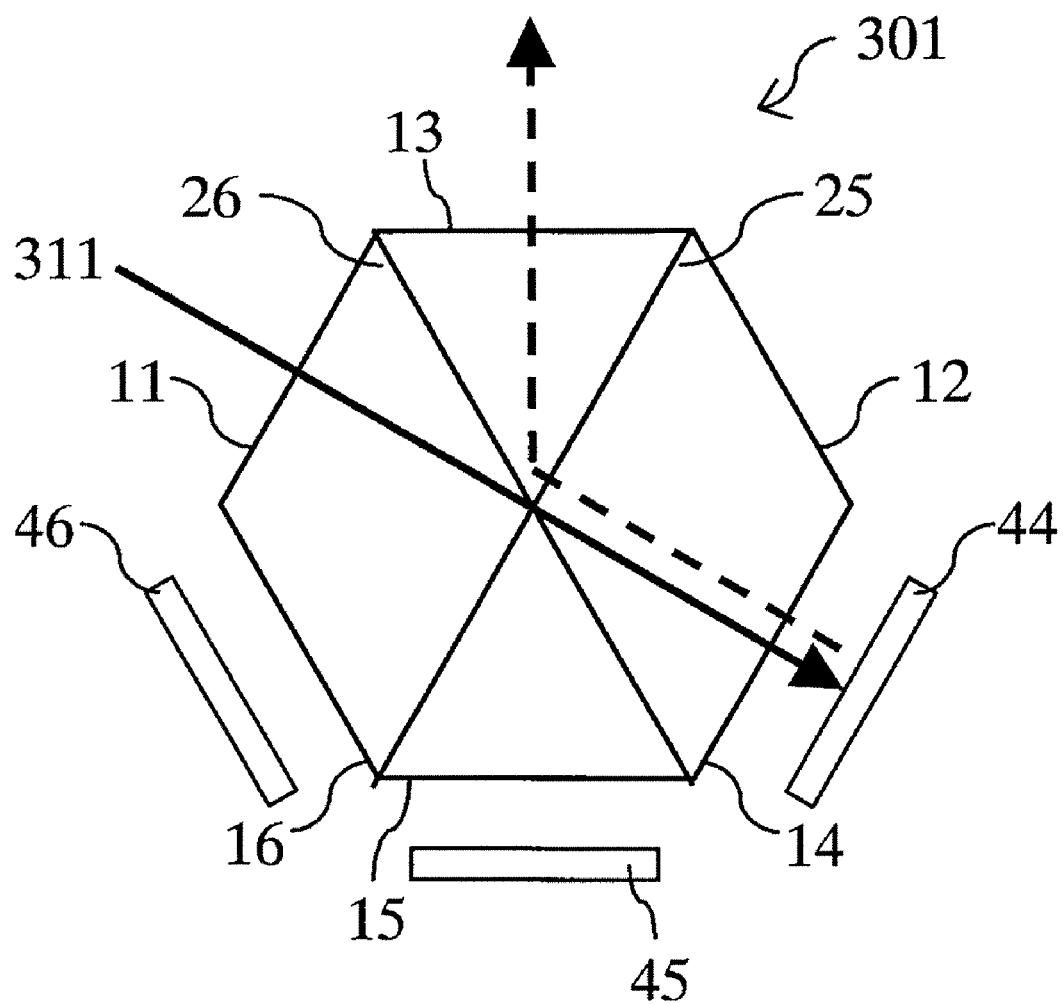
FIG. 9A is a view showing a basic optical action of the color separating/combining prism of Embodiment 4 for blue ray.
Figure 9B:
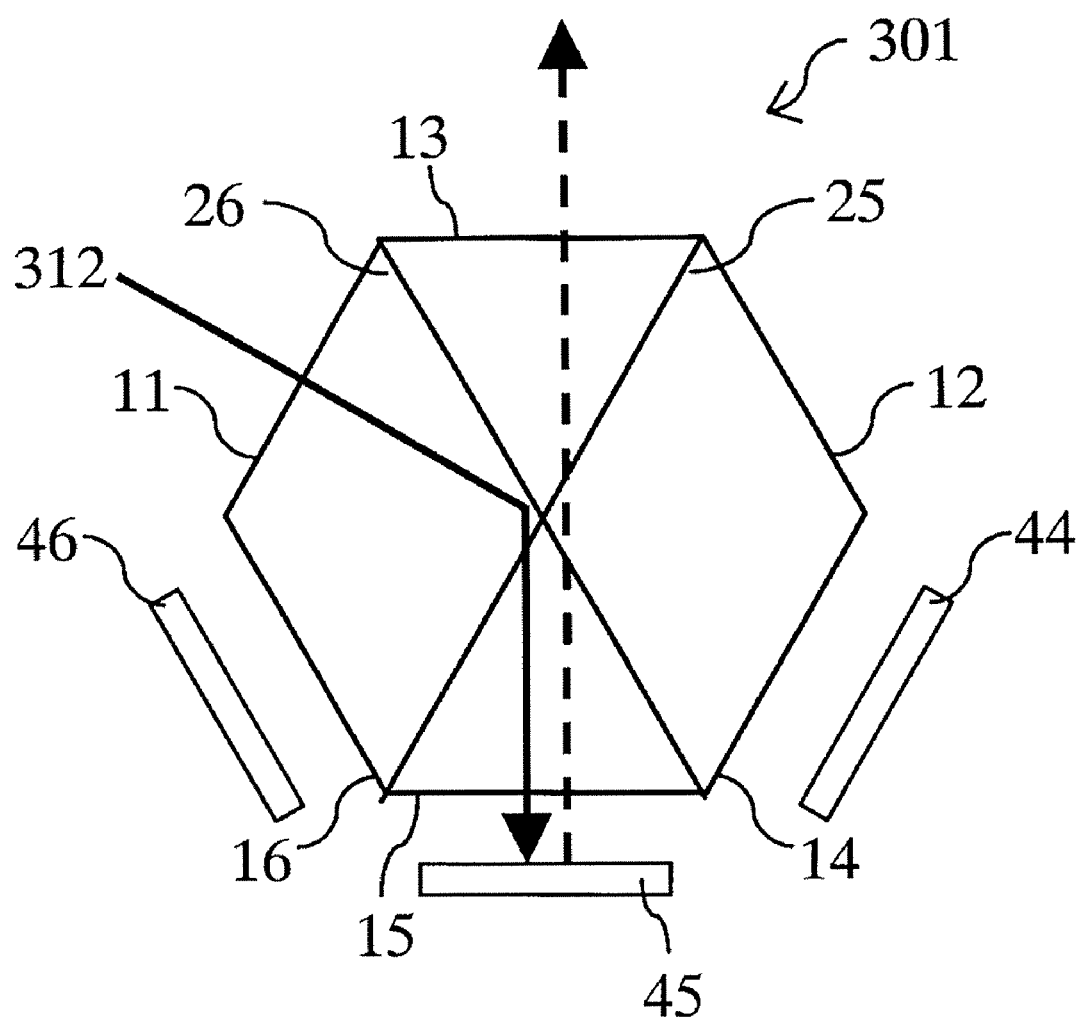
FIG. 9B is a view showing a basic optical action of the color separating/combining prism of Embodiment 4 for red ray.
Figure 9C:
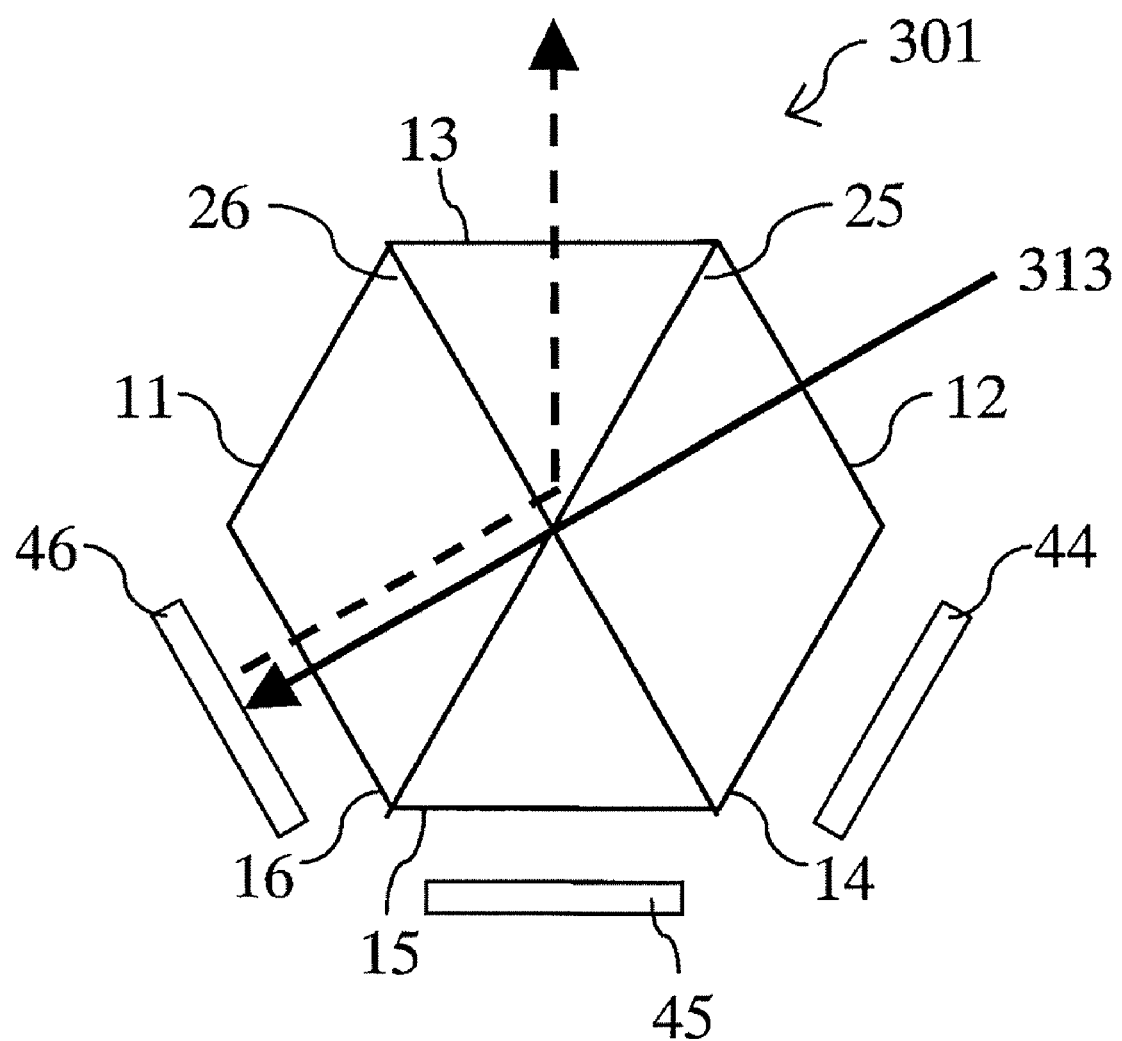
FIG. 9C is a view showing a basic optical action of the color separating/combining prism of Embodiment 4 for green ray.

FIGS. 9A to 9C show basic optical actions of the color separating/combining prism 301 of this embodiment. FIG. 9A shows an optical path when a blue wavelength light (hereinafter, simply, referred to as a blue ray) 311 introduced from the light source enters the color separating/combining prism 301 from the first entrance surface 11 thereof as S-polarized light. In FIGS. 9A to 9C, a solid line indicates S-polarized light, and a dashed line indicates P-polarized light. S-polarized light and P-polarized light are different from each other in polarization state.

The blue ray 311 entering the color separating/combining prism 301 impinges on the first multilayer film 25 at an incident angle of 0° to be transmitted therethrough, and then impinges on the second multilayer film 26 at an incident angle of 60° to be transmitted therethrough.

Moreover, in some incident positions thereof, the blue ray 311 impinges on the second multilayer film 26 at an incident angle of 60° to be transmitted therethrough, and then impinges on the first multilayer film 25 at an incident angle of 0° to be transmitted therethrough.

In this way, even when the blue ray 311 impinges at any position of the multilayer films 25 and 26, the blue ray 311 is transmitted through the first and second multilayer films 25 and 26, and emerges outside the color separating/combining prism 301 from the first entrance/emergence surface 14 thereof that is opposite to the first entrance surface 11.

Then, the blue ray 311 enters a reflective liquid crystal panel (hereinafter, simply referred to as a blue panel) 44 for a blue wavelength range.

The blue ray 311 reflected by the blue panel 44 and subjected to image modulation re-enters the color separating/combining prism 301 from the first entrance/emergence surface 14 thereof as P-polarized light. The blue ray 311 re-entering the color separating/combining prism 301 impinges on the first multilayer film 25 at an incident angle of 0° to be transmitted therethrough, and then impinges on the second multilayer film 26 at an incident angle of 60° to be reflected thereby.

Moreover, in some incident positions thereof, the blue ray 311 impinges on the second multilayer film 26 at an incident angle of 60° to be reflected thereby, and then impinges on the first multilayer film 25 at an incident angle of 0° to be transmitted therethrough.

In this way, even when the re-entering blue ray 311 impinges at any position of the multilayer films 25 and 26, the blue ray 311 is transmitted through the first multilayer film 25 and reflected by the second multilayer film 26.

Then, the blue ray 311 emerges outside the color separating/combining prism 301 from the emergence surface 13 thereof, and proceeds to a projection lens (not shown).

FIG. 9B shows an optical path when a red wavelength light (hereinafter, simply referred to as a red ray) 312 introduced from the light source enters the color separating/combining prism 301 from the first entrance surface 11 thereof as S-polarized light. The red ray 312 entering the color separating/combining prism 301 impinges on the first multilayer film 25 at an incident angle of 0° to be transmitted therethrough, and then impinges on the second multilayer film 26 at an incident angle of 60° to be reflected thereby.

Moreover, in some incident positions thereof, the red ray 312 impinges on the second multilayer film 26 at an incident angle of 60° to be reflected thereby, and then impinges on the first multilayer film 25 at an incident angle of 0° to be transmitted therethrough.

In this way, even when the red ray 312 impinges at any position of the multilayer films 25 and 26, it is transmitted through the first multilayer film 25 and reflected by the second multilayer film 26.

Then, the red ray 312 emerges outside the color separating/combining prism 301 from the second entrance/emergence surface 15 thereof, and enters a reflective liquid crystal panel (hereinafter, simply referred to as a red panel) 45 for a red wavelength range.

The red ray 312 reflected by the red panel 45 and subjected to image modulation, re-enters the color separating/combining prism 301 from the second entrance/emergence surface 15 thereof as P-polarized light. The red ray 312 re-entering the color separating/combining prism 301 impinges on the first multilayer film 25 at an incident angle of 60° to be transmitted therethrough, and then impinges on the second multilayer film 26 at an incident angle of 60° to be transmitted therethrough.

Moreover, in some incident positions thereof, the red ray 312 impinges on the second multilayer film 26 at an incident angle of 60° to be transmitted therethrough, and then impinges on the first multilayer film 25 at an incident angle of 60° to be transmitted therethrough.

In this way, even when the re-entering red ray 312 impinges at any position of the multilayer films 25 and 26, the red ray 312 is transmitted through the first and second multilayer films 25 and 26.

Then, the red ray 312 emerges outside the color separating/combining prism 301 from the emergence surface 13 thereof that is opposite to the second entrance/emergence surface 15, and proceeds to the projection lens.

FIG. 9C shows an optical path when a green wavelength light (hereinafter, simply referred to as a green ray) 313 introduced from the light source enters the color separating/combining prism 301 from the second entrance surface 12 thereof as S-polarized light. The green ray 313 entering the color separating/combining prism 301 impinges on the first multilayer film 25 at an incident angle of 60° to be transmitted therethrough, and then impinges on the second multilayer film 26 at an incident angle of 0° to be transmitted therethrough.

Moreover, in some incident positions thereof, the green ray 313 impinges on the second multilayer film 26 at an incident angle of 0° to be transmitted therethrough, and then impinges on the first multilayer film 25 at an incident angle of 60° to be transmitted therethrough.

In this way, even when the green ray 313 impinges at any position of the multilayer films 25 and 26, the green ray 313 is transmitted through the first and second multilayer films 25 and 26.

Then, the green ray 313 emerges outside the color separating/combining prism 301 from the third entrance/emergence surface 16 that is opposite to the second entrance surface 12 thereof, and enters a reflective liquid crystal panel (hereinafter, simply referred to as a green panel) 46 for a green wavelength range.

The green ray 313 reflected by the green panel 46 and subjected to image modulation re-enters the color separating/combining prism 301 from the third entrance/emergence surface 16 thereof as P-polarized light. The green ray 313 re-entering the color separating/combining prism 301 impinges on the first multilayer film 25 at an incident angle of 60° to be reflected thereby, and then impinges on the second multilayer film 26 at an incident angle of 0° to be transmitted therethrough.

Moreover, in some incident positions thereof, the green ray 313 impinges on the second multilayer film 26 at an incident angle of 0° to be transmitted therethrough, and then impinges on the first multilayer film 25 at an incident angle of 60° to be reflected thereby.

In this way, even when the re-entering green ray 313 impinges at any position of the multilayer films 25 and 26, it is reflected by the first multilayer film 25 and transmitted through the second multilayer film 26.

Then, the green ray 313 emerges outside the color separating/combining prism 301 from the emergence surface 13 thereof, and proceeds to the projection lens.

As mentioned above, the color separating/combining prism 301 of the present embodiment can perform optical path separation (color separation) of the blue, red and green rays 311 to 313 towards the blue, red and green panels 44 to 46, and color combination of the rays 311 to 313 from the three panels 44 to 46 in one prism.

Next, the first and second multilayer films 25 and 26 will be described in more detail. The first multilayer film 25 has an antireflection function of transmitting a ray whose incident angle is 0°, and a polarization splitting function of transmitting S-polarized light whose incident angle is 60° and reflecting P-polarized light whose incident angle is 60°. This is the same as that of Embodiment 1, and the film configuration is also the same as that of Embod The second multilayer film 26 has a light-transmission function (antireflection function) of transmitting a ray in a green wavelength range impinging thereon at an incident angle of 0°. Further, the second multilayer film 26 has a polarization splitting function of transmitting S-polarized light in a blue wavelength range impinging thereon at an incident angle of 60° and reflecting P-polarized light in the blue wavelength range impinging thereon at an incident angle of 60°, and a polarization splitting function of reflecting S-polarized light in a red wavelength range impinging thereon at an incident angle of 60° and transmitting P-polarized light in the red wavelength range impinging thereon at an incident angle of 60°.

In the above-mentioned Japanese Patent Laid-open Nos. 2006-47903 and 2006-79058, a wavelength-selective polarization splitting film has been disclosed, which transmits S-polarized light in a specific wavelength range and reflects P-polarized light in the specific wavelength range, and reflects S-polarized light in another specific wavelength range and transmits P-polarized light in the other specific wavelength range. In these documents, the wavelength-selective polarization splitting film as a multilayer film is obtained by utilizing attenuated total reflection and using a specific film configuration.

Based on the film configuration, a multilayer film was designed which has a polarization splitting function of transmitting S-polarized light impinging thereon at an incident angle of 60° and reflecting P-polarized light impinging thereon at an incident angle of 60, and has a polarization splitting function of reflecting S-polarized light in the red wavelength range impinging thereon at an incident angle of 60° and transmitting P-polarized light in the red wavelength range impinging thereon at an incident angle of 60°. Further, in a green wavelength range, the multilayer film was also designed so that it has a light-transmission function of transmitting a ray impinging thereon at an incident angle of 0°.

Figure 10A:
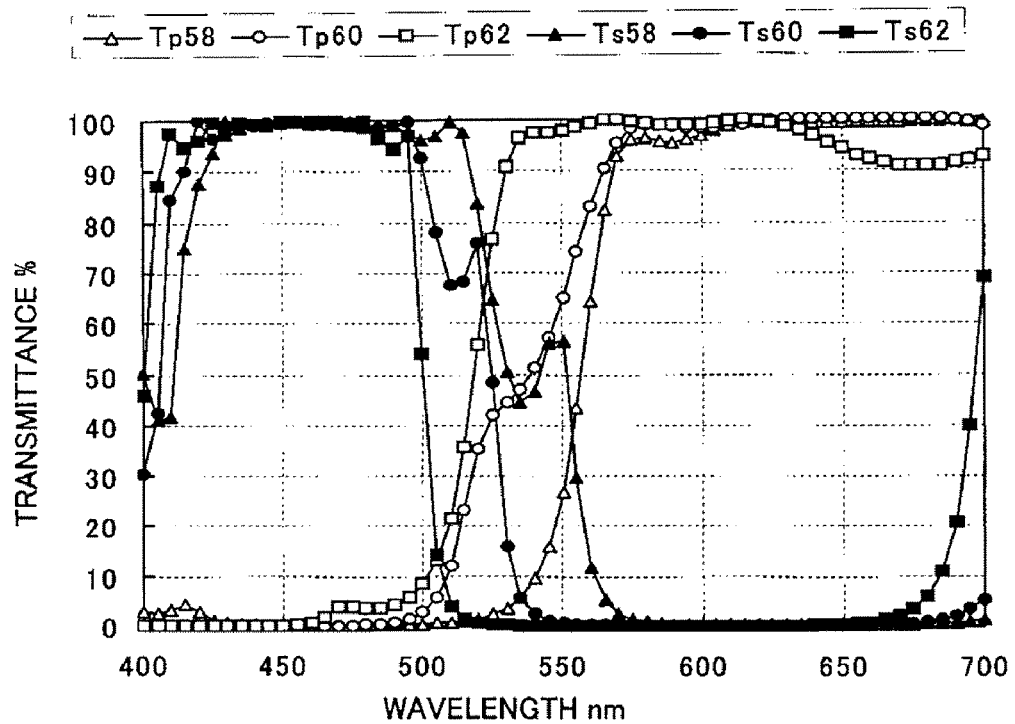
FIG. 10A is a view showing characteristics of multilayer films used for a color separating/combining prism of Embodiment 4.
Figure 10B:
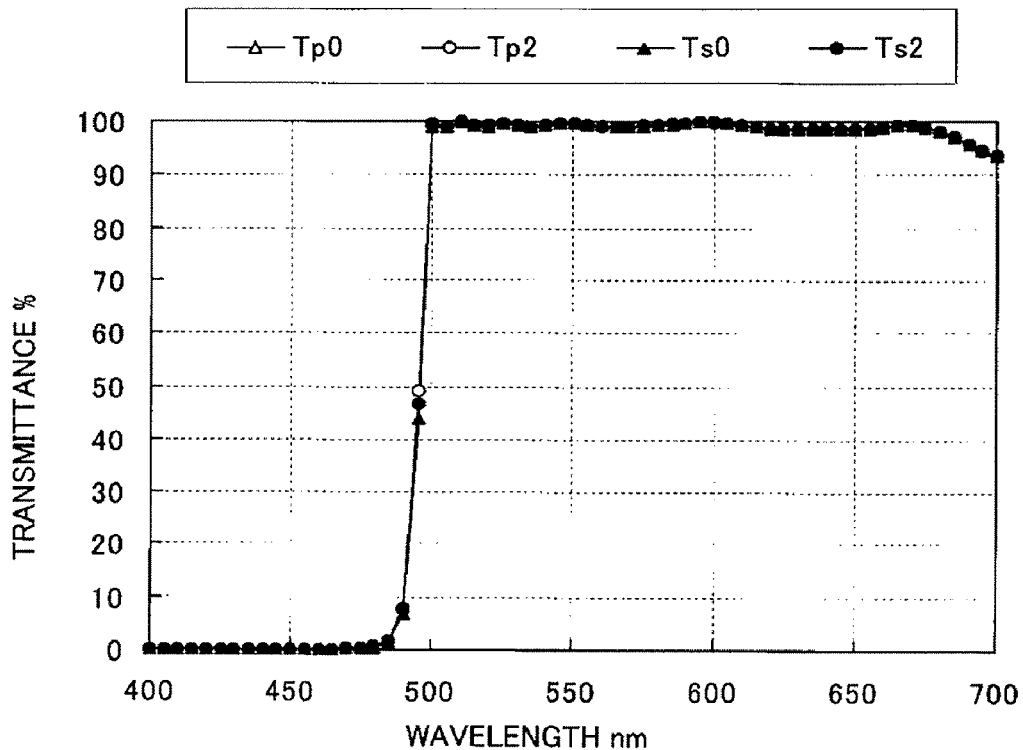
FIG. 10B is a view showing characteristics of another multilayer films used for a color separating/combining prism of Embodiment 4.

Film designing was performed using S-LAH55 (trade name of OHARA Inc.) as an entrance side medium being an prism base material, TiO2 as an H layer, SiO2 as an L layer, and PVCz as an emergence side medium being an adhesive material. The designed result of the film at that time is shown in FIGS. 10A and 10B, and the film configuration is given in Table 2. The number of layers is 46.

FIG. 10A shows simulation results of the transmittances when P-polarized light and S-polarized light impinged on each multilayer film at incident angles of 60° and near 60°. Tp60, Tp58, and Tp62 show transmittances when P-polarized light impinged thereon at incident angles of 60°, 58°, and 62°, respectively. Moreover, Ts60, Ts58, and Ts62 show transmittances when S-polarized light impinged thereon at incident angles of 60°, 58°, and 62°, respectively. In a projector, in many cases, the incident angle of impinging light has a distribution, so that transmittances at incident angles of 60° (reference angle) ±2° are also shown.

As understood from FIG. 10A, a polarization splitting characteristic of transmitting S-polarized light in a blue wavelength range having an incident angle of 60° and reflecting P-polarized light in the blue wavelength range having an incident angle of 60°, and a polarization splitting characteristic of reflecting S-polarized light in a red wavelength range having an incident angle of 60° and transmitting P-polarized light in the red wavelength range having an incident angle of 60°, are obtained.

FIG. 10B shows simulation results of the transmittances when P-polarized light and S-polarized light impinged on each multilayer film at incident angles of 0° and near θ0. Tp0 and Tp2 show transmittances when P-polarized light impinged thereon at incident angles of 0° and 2°, respectively. Moreover, Ts0 and Ts2 show transmittances when S-polarized light impinged thereon at incident angles of 0° and 2°, respectively.

From the reason mentioned above, a transmittance at an incident angle of ±2° with respect to the incident angle of 0° that is a reference is also shown. Since a ray impinges on each of multilayer films vertically, Tp0 and Ts0 are completely identical. Moreover, since each multilayer film is insensible to the angular characteristic near the vertical incidence, significant difference between Tp2 and Ts2 is not seen. As understood from FIG. 10B, a characteristic with a high transmittance for a green wavelength range is also obtained.

As described above, in the present Embodiment, the multilayer film has a light-transmission function for a ray in a first wavelength range, whose incident angle is a predetermined angle. Further, for light in a second wavelength range having another incident angle, the multilayer film has a polarization splitting function which has a higher transmittance for P-polarized light than that for S-polarized light, and for light in a third wavelength range having the other incident angle, the multilayer film has a higher transmittance for S-polarized light than that for P-polarized light.

More preferably, in the multilayer film, for light in the second wavelength range having an incident angle of θ2, the transmittance for P-polarized light is higher than that for S-polarized light by 60% or more. Moreover, for light in the third wavelength range having an incident angle of θ2, the transmittance for S-polarized light is higher than that for P-polarized light by 60% or more. Further, the second and the third wavelength ranges have a bandwidth equal to or greater than 30 nm.

Using such a multilayer film 26 that has a wavelength-selective light-transmission function and a polarization splitting function can provide the color separating/combining prism 301.

In addition, the material of the prism base material, the material of a thin film, the number of kinds of thin films to be used, the order of the thin films, the number of layers, and the film thicknesses given in Table 2 are mere examples, and embodiments of the present invention are not limited thereto.

As described in Embodiments 2 and 3, even when using one prism whose base shape is not an equilateral hexagonal pillar, color separation and color combination can be performed. Accordingly, it is not necessary that the shape of the color separating/combining prism is an equilateral hexagonal pillar, thereby enabling to design a prism shape and a multilayer film corresponding to any incident angle.

Moreover, in the present embodiment, the multilayer film has a light-transmission function (antireflection function) of transmitting a ray in a green wavelength range impinging thereon at incident angles of 0°. Further, it has a polarization splitting function of transmitting S-polarized light in a blue wavelength range impinging thereon at an incident angles of 60° and reflecting P-polarized light in the blue wavelength range impinging thereon at an incident angles of 60°, and a polarization splitting function of reflecting S-polarized light in a red wavelength range impinging thereon at an incident angles of 60° and transmitting P-polarized light in the red wavelength range impinging thereon at an incident angles of 60°.

However, embodiments of the present invention are not limited to the combination of the color wavelength ranges of the light-transmission function and the polarization splitting function mentioned above, and individual designing is also possible.

In the color separating/combining prisms of Embodiments 1 to 4, six surfaces of a virtual hexagonal pillar that is a base shape, other than hexagonal end surfaces, are optical surfaces, and two entrance surfaces, one emergence surface, and three entrance/emergence surfaces are provided among them. Therefore, as the incident angle of a ray to be subjected to polarization splitting becomes larger, the size of the prism will be increased. Accordingly, in practice, it is necessary that the angle θ0 made by two multilayer films satisfies the following relationship:

$$45° < θ0 < 75°.$$

Moreover, as to the multilayer film, in the entire wavelength region, it is preferable that the incident angle θ1 of a ray to be subjected to antireflection (transmission) and the incident angle θ2 of a ray to be subjected to polarization splitting have the following relationship:

$$θ2 - θ1 > 30°.$$

If these relationships are not satisfied, since the size of the prism becomes too large, advantages in compactness and in shortening of the back focus of a projection lens may be lost as compared to a conventional projector configured by three or four prisms including a dichroic element and a polarization beam splitter. However, the relationship: θ2−θ1>30° is not a condition to be necessarily satisfied.

Moreover, the color separating/combining prisms described in Embodiments 1 to 4, when viewed in a plane, have a line-symmetric shape (plane-symmetric shape when viewed three dimensionally). However, they may have a non-line-symmetric shape. In this case, through multilayer films where the first multilayer film and the second multilayer film have different optical characteristics will be obtained, they can also be designed similar to the case of each embodiment.

As described above, according to each of the embodiments, utilizing so-called attenuated total reflection can provide an optical element which includes multilayer films having in an entire visible wavelength region a light-transmission function for a ray impinging thereon at a predetermined incident angle and a polarization splitting function for P-polarized light and S-polarized light impinging thereon at another incident angle.

This enables to perform color separation and color combination using a hexagonal pillar-like prism element. Moreover, using such an optical element can reduce the back focus of a projection lens in the image projection apparatus mentioned below, thereby miniaturizing the projection lens and whole of the apparatus.

Embodiment 5

Figure 11:
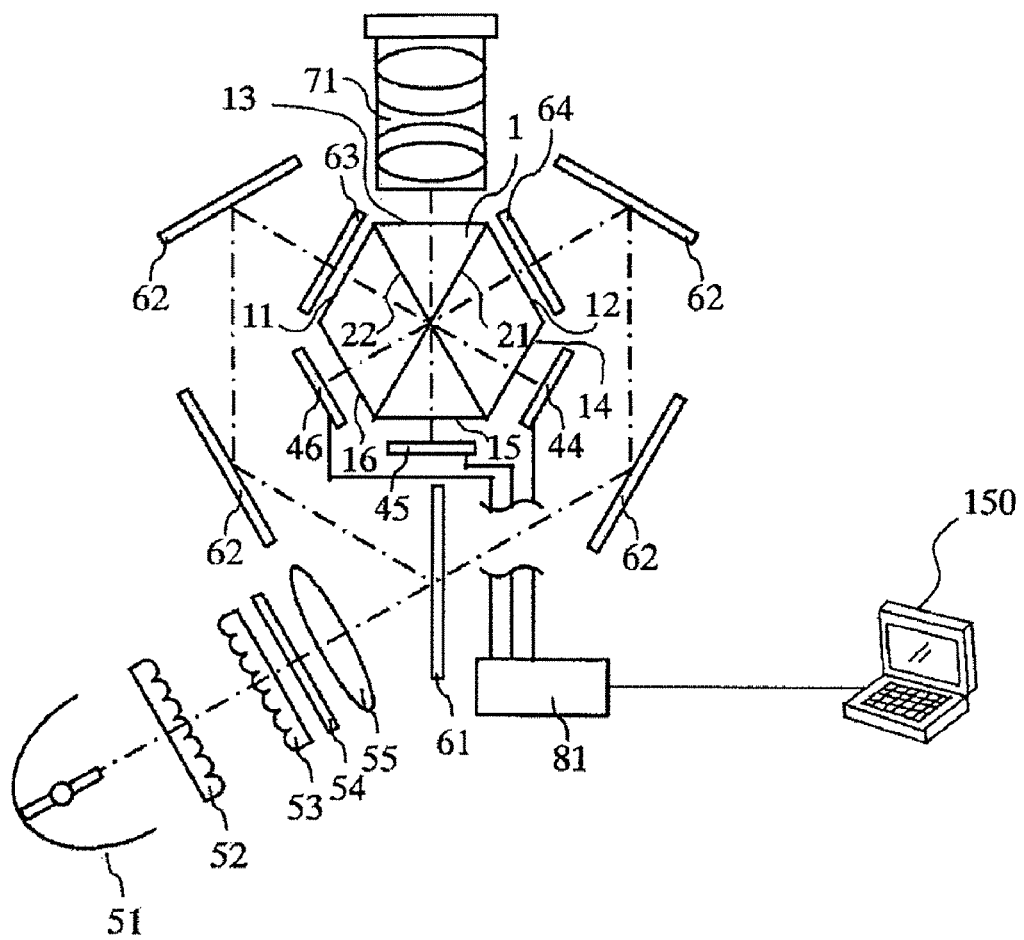
FIG. 11 is a schematic view of a projector that is Embodiment 5 of the present invention.

FIG. 11 shows a schematic configuration of a projector (image projection apparatus) that is Embodiment 5 of the present invention. The projector of this embodiment uses the color separating/combining prism 1 described in Embodiment 1.

From a light source 51 such as a high-pressure mercury lamp, white light converted into parallel luminous flux is emitted. The parallel luminous flux herein includes not only perfectly parallel luminous flux but also luminous flux diffusing or converging to such an extent that it can be regarded as being parallel in a characteristic of an optical system. This is also the same in the following embodiments.

This parallel luminous flux is divided into a plurality of luminous fluxes by a first fly-eye lens 52, and each divided luminous flux is converged. Each divided luminous flux is converged near a second fly-eye lens 53 and a polarization conversion element 54, and forms an image (secondary light source image) of the light source 51.

The fly-eye lenses 52 and 53 have a configuration where a plurality of lens cells are arranged two dimensionally. Each lens cell has a rectangular lens shape similar to those of blue, red and green panels 44 to 46 that are reflective liquid crystal display elements (reflective image-forming elements) arranged on a surface to be illuminated.

The polarization conversion element 54 converts each divided luminous flux emerging from the second fly-eye lens 53 into S-polarized light. The light emerging from the polarization conversion element 54 enters a color-separation/combination optical system, while being condensed by a condenser lens 55. The color-separation/combination optical system separates the entering light into blue wavelength range light, red wavelength range light and green wavelength range light (hereinafter, simply referred to as blue light, red light and green light). The blue light, the red light and the green light are condensed by the condenser lens 55 to superposedly illuminate a green panel 44, a red panel 45 and a green panel 46, respectively. In addition, an optical system from the light source 51 to the condenser lens 55 is referred to as an illumination optical system, and an optical system including the illumination optical system, the color-separation/combination optical system and a projection lens 71 as a projection system is referred to as an optical system for image projection. This is also applied to embodiments described below.

Hereinafter, the color-separation/combination optical system will be described. The polarized light transmitted through the condenser lens 55 impinges on a dichroic mirror 61 which reflects blue light and red light and transmits green light. The blue light and the red light reflected by the dichroic mirror 61 are reflected by two mirrors 62 and enter a wavelength-selective phase element 63. The wavelength-selective phase element 63 rotates by 90° only the polarization direction of red light.

The blue light emerging from the wavelength-selective phase element 63 as S-polarized light enters the color separating/combining prism 1 from the first entrance surface 11 thereof. Then, the blue light impinges on the first multilayer film 21 at an incident angle of 0° to be transmitted therethrough, and then impinges on the second multilayer film 22 at an incident angle of 60° to be transmitted therethrough.

In this way, the blue light transmitted through the first multilayer film 21 and the second multilayer film 22 emerges outside the color separating/combining prism 1 from the first entrance/emergence surface 14 thereof which is opposite to the first entrance surface 11, and then enters the blue panel 44.

Here, the panels 44 to 46 are connected to a drive circuit 81. Into the drive circuit 81 which is part of the projector, image signals (image information) from an image supplying apparatus 150 such as a personal computer, a DVD player, a VCR and a TV tuner, are input. The drive circuit 81 drives the panels 44 to 46 for respective colors based on R, G and B components of the input image signal. Thereby, each panel reflects and image-modulates the entering light to cause image light to emerge therefrom. The projector and the image supplying apparatus 150 constitute an image display system. In addition, although such a configuration is not shown in the following embodiments, the same configuration is also employed in the following embodiments.

The blue light (blue image light) reflected and image-modulated by the blue panel 44 re-enters the color separating/combining prism 1 from the first entrance/emergence surface 14 thereof as P-polarized light. The blue image light entering the color separating/combining prism 1 impinges on the first multilayer film 21 at an incident angle of 0° to be transmitted therethrough, and then impinges on the second multilayer film 22 at an incident angle of 60° to be reflected thereby.

In this way, the blue image light transmitted through the first multilayer film 21 and reflected by the second multilayer film 22 emerges outside the color separating/combining prism 1 from the emergence surface 13 thereof, and then enters the projection lens 71 to be projected on a screen (projection surface, not shown).

The red light converted into P-polarized light by the wavelength-selective phase element 63 enters the color separating/combining prism 1 from the first entrance surface 11 thereof. The red light that is P-polarized light impinges on the first multilayer film 21 at an incident angle of 0° to be transmitted therethrough, and then impinges on the second multilayer film 22 at an incident angle of 60° to be reflected thereby.

In this way, the red light transmitted through the first multilayer film 21 and reflected by the second multilayer film 22 emerges outside the color separating/combining prism 1 from the second entrance/emergence surface 15 thereof, and enters the red panel 45.

The red image light reflected and image-modulated by the red panel 45 re-enters the color separating/combining prism 1 from the second entrance/emergence surface 15 thereof as S-polarized light. The red image light entering the color separating/combining prism 1 impinges on the first multilayer film 21 at an incident angle of 0° to be transmitted therethrough, and then impinges on the second multilayer film 22 at an incident angle of 60° to be transmitted therethrough.

In this way, the red image light transmitted through the first multilayer film 21 and the second multilayer film 22 emerges outside the color separating/combining prism 1 from the emergence surface 13 thereof that is opposite to the second entrance/emergence surface 15, and then enters the projection lens 71 to be projected on the screen.

The green light transmitted through the dichroic mirror 61 is reflected by the two mirrors 62 and then enters an optical member 64. The optical member 64 is provided so as to cause the optical path length of the green light to be equal to those of the blue light and the red light.

The green light emerging from the optical member 64 enters the color separating/combining prism 1 from the second entrance surface 12 thereof. The green light entering the color separating/combining prism 1 as S-polarized light impinges on the first multilayer film 21 at an incident angle of 60° to be transmitted therethrough, and then impinges on the second multilayer film 22 at an incident angle of 0° to be transmitted therethrough.

In this way, the green light transmitted through the first multilayer film 21 and the second multilayer film 22 emerges outside the color separating/combining prism 1 from the third entrance/emergence surface 16 thereof that is opposite to the second entrance surface 12, and then enters the green panel 46.

The green image light reflected and image-modulated by the green panel 46 re-enters the color separating/combining prism 1 from the third entrance/emergence surface 16 thereof as P-polarized light. The green image light entering the color separating/combining prism 1 impinges on the first multilayer film 21 at an incident angle of 60° to be reflected thereby, and then impinges on the second multilayer film 22 at an incident angle of 60° to be transmitted therethrough. In this way, the green image light reflected by the first multilayer film 21 and transmitted through the second multilayer film 22 emerges outside the color separating/combining prism 1 from the emergence surface 13 thereof, and then enters the projection lens 71 to be projected on the screen.

As described above, using one color separating/combining prism 1 of Embodiment 1 whose base shape is a shape of a hexagonal pillar can provide a color-separation/combination optical system for a projector using a reflective liquid crystal panel.

Moreover, using only one color separating/combining prism 1 of Embodiment 1 can shorten the back focus of the projection lens 71, resulting in the miniaturized projection lens 71. This enables to reduce the number of components of the projector and miniaturize the projector.

In addition, in the projector of this embodiment, the blue light, the red light and the green light may be interchanged mutually. Moreover, the color separating/combining prisms described in Embodiments 2 and 3 may be used. These are also applied to the following embodiments.

Moreover, for the projector of this embodiment, the color separating/combining prism described in Embodiment 4 may be used. However, in this case, as shown in Embodiment 4, all polarization directions of blue light, red light and green light entering the color separating/combining prism are the direction of S-polarized light. Therefore, in the projector of this embodiment, conversion of red light into P-polarized light using the wavelength-selective phase element 63 is not required, and red light is entered into the color separating/combining prism as S-polarized light. Accordingly, it is necessary to remove the wavelength-selective phase element 63.

In addition, it is also necessary to remove the optical member 64 which is provided on the optical path of green light so as to cause the optical path length of green light to be equal to those of blue light and red light.

In this way, the use of the color separating/combining prism of Embodiment 4 enables to further reduce the number of components of the projector and the cost of the projector.

Embodiment 6

Figure 12:
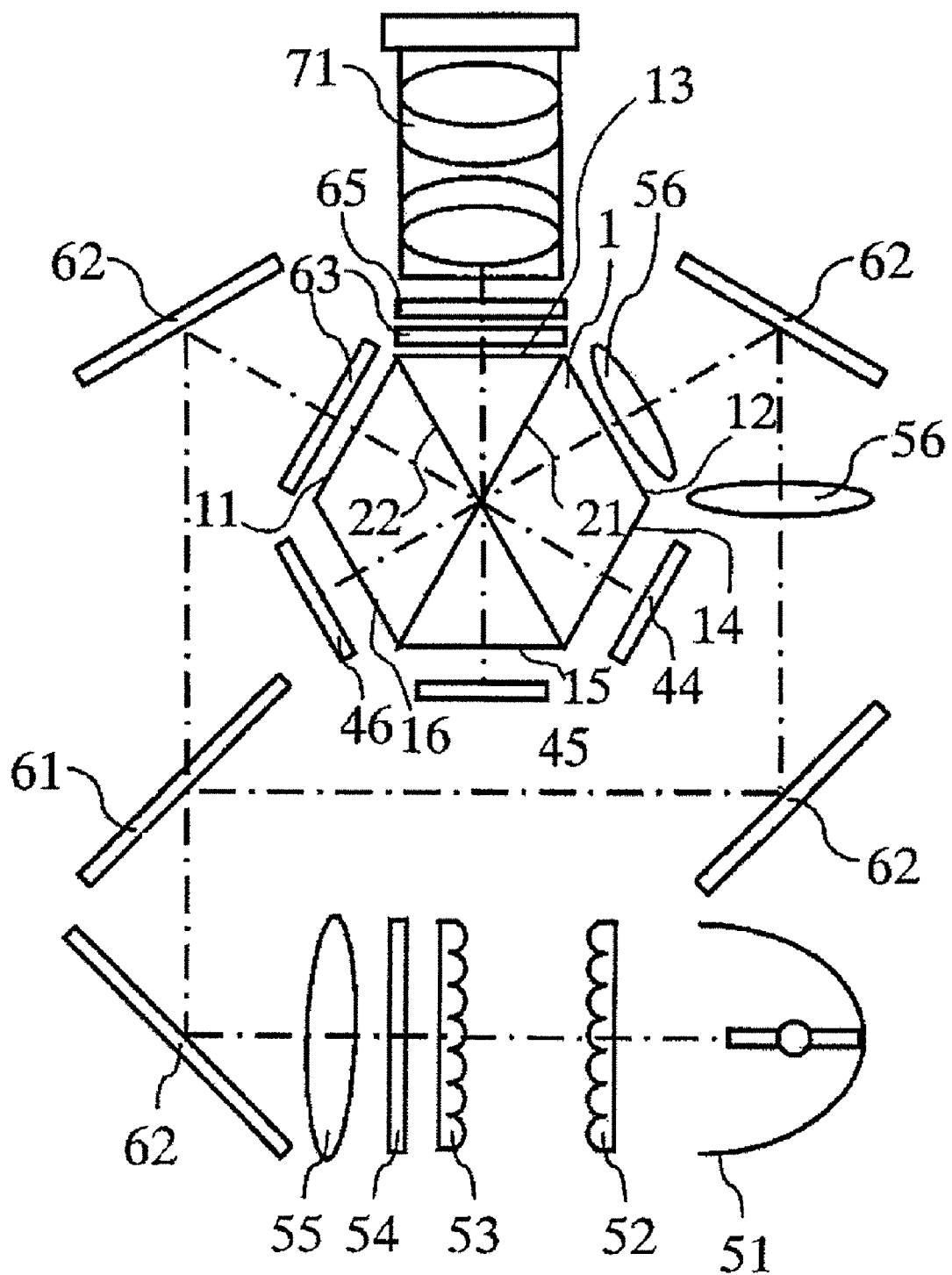
FIG. 12 is a schematic view of a projector that is Embodiment 6 of the present invention.

FIG. 12 shows a schematic configuration of a projector that is Embodiment 6 of the present invention. In the projector of this embodiment, the color separating/combining prism 1 described in Embodiment 1 is used. Moreover, the same components as those in Embodiment 5 are denoted by the same reference numerals in Embodiment 5.

The optical actions from a light source 51 to a condenser lens 55 are the same as those of Embodiment 5. However, in this embodiment, light from the light source 51 is reflected by mirrors 62, thereby changing its traveling direction before entering a dichroic mirror 61.

Blue light, red light and green light transmitted through the dichroic mirror 61 are reflected by the mirrors 62, respectively, and then enter the color separating/combining prism 1. In this case, in order to cause the optical path lengths of the blue light and the red light to be equal to that of the green light, a relay lens 56 is provided for the optical path of the green light. This enables to superposedly illuminate each color panel with each color light.

The actions of the color separating/combining prism 1 are similar to those of Embodiment 3. In this embodiment, a wavelength-selective phase element 63 and a polarizer 65 are provided at the emergence side of the color separating/combining prism 1. Blue image light and green image light emerging from the color separating/combining prism 1 are P-polarized light, and red image light is S-polarized light. The wavelength-selective phase element 63 rotates by 90° only the polarization direction of red image light. Thereby, all of the blue image light, the red image light and the green image light emerged from the wavelength-selective phase element 63 become S-polarized light. After that, the blue image light, the red image light and the green image light transmitted through a polarizer 65 that cuts P-polarized light enter a projection lens 71 to be projected on a screen (not shown in the figure).

In a case of a black display, the polarization direction of light reflected by each panel is the same as that of the light entering the panel. Therefore, the light reflected by each panel is returned toward the light source 51 through the color separating/combining prism 1. However, part of the light returning toward the light source 51 becomes leakage light in the color separating/combining prism 1, and is projected on a screen through the projection lens 71 from the color separating/combining prism 1. This leakage light causes a reduction of contrast.

However, in this embodiment, since the leakage light is emerged from the wavelength-selective phase element 63 as P-polarized light, it is cut by the polarizer 65. Therefore, the contrast reduction due to the leakage light can be avoided.

As described above, using the color separating/combining prism 1 whose base shape is a hexagonal pillar, the wavelength-selective phase element 63 and the polarizer 65 arranged on the emergence side of the color separating/combining prism 1 can provide a color-separation/combination optical system (that is a projector) capable of projecting a high constant image. Moreover, in this embodiment, the optical system constituted by the mirrors 62 and the relay lenses 56 is configured within a nearly rectangular range. Therefore, miniaturization of the projector that is the final form can be achieved, thereby facilitating handling of the projector.

Moreover, for a projector of this embodiment, the color separating/combining prism described in Embodiment 4 may be used. However, in this case, similar to the case shown in Embodiment 5, removal of the wavelength-selective phase element 63 on entrance side of the color separating/combining prism is required. Moreover, as shown in Embodiment 4, all polarization directions of blue light, red light and green light emerging from the color separating/combining prism are the direction of P-polarized light. Therefore, in the projector of this embodiment, conversion of the polarization direction of red light using the wavelength-selective phase element 63 on emergence side of the color separating/combining prism is not required, and blue light, red light and green light are therefore emerged as P-polarized light. After that, leakage light can be cut using a polarizer 65 for cutting S-polarized light.

In this way, the use of the color separating/combining prism of Embodiment 4 enables to further reduce the number of components of the projector and the cost of the projector.

In addition, it is also possible to cut the leakage light using the polarizer 65 in Embodiment 5, and this is also applied to the following embodiments.

Embodiment 7

Figure 13:
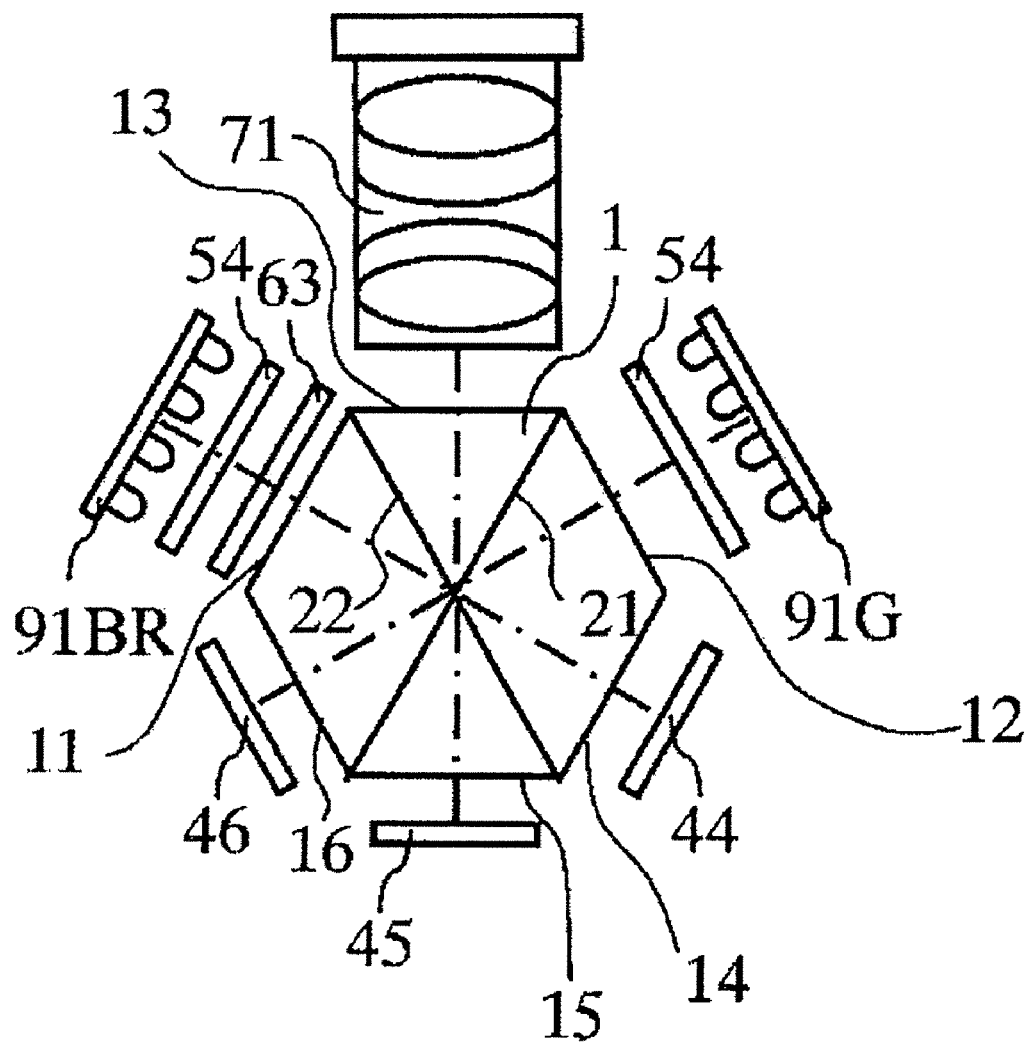
FIG. 13 is a schematic view of a projector that is Embodiment 7 of the present invention

FIG. 13 shows a schematic configuration of a projector that is Embodiment 7 of the present invention. The projector of this embodiment uses the color separating/combining prism 1 described in Embodiment 1. Moreover, the same components as those in Embodiments 5 and 6 are denoted by the same reference numerals in Embodiments 5 and 6.

This Embodiment uses light source arrays 91BR and 91G, as a light source, which include a plurality of light-emitting diodes emitting blue light, red light and green light, respectively. In addition, as a similar light source array, arrays using laser diodes or organic electroluminescence elements may be used. This is applied to the following embodiments.

In the array light source 91BR, a plurality of light-emitting diodes emitting red light and a plurality of light emitting diodes emitting blue light are respectively arranged two-dimensionally. The blue light and the red light emitted from the array light source 91BR enter a polarization conversion element 54 as non-polarized light, and are converted into S-polarized light.

The blue light and the red light emerged from the polarization conversion element 54 as S-polarized light enter a wavelength-selective phase element 63, and therein only the polarization direction of the red light is rotated by 90°. The blue light emerging from the wavelength-selective phase element 63 as S-polarized light and the red light emerging from the wavelength-selective-phase element 63 as P-polarized light enter the color separating/combining prism 1 from the first entrance surface 11 thereof. The actions of the color separating/combining prism 1 are similar to those of Embodiment 3. Therefore, blue image light and red image light emerge outside the color separating/combining prism 1 from the emergence surface 13 thereof, and then enter a projection lens 71 to be projected on a screen.

The wavelength-selective phase element 63 may be provided to the entrance side of a condenser lens 55.

In the array light source 91G, a plurality of light-emitting diodes emitting green light are arranged two-dimensionally. The green light emitted from the array light source 91G enters the polarization conversion element 54 as non-polarized light, and is converted into S-polarized light. The green light emerging from the polarization conversion element 54 as S-polarized light enters the color separating/combining prism 1 from the second entrance surface 12 thereof. The actions of the color separating/combining prism 1 are similar to those of Embodiment 3. Therefore, the green image light emerges outside the color separating/combining prism 1 from the emergence surface 13 thereof, and then enters the projection lens 71 to be projected on a screen.

As described above, using array light sources generating light with different wavelengths and the color separating/combining prism of Embodiment 1 can provide a projector whose configuration is very simple. In other words, a projector which has a reduced number of components and a reduced size as compared to conventional projectors.

Moreover, since the white light source (such as a high-pressure mercury lamp) shown in Embodiments 4 and 5 generates very large amount of heat, cooling mechanism for cooling the heat, such as a cooling fan, is required. However, in this embodiment, the light source does not generate such a large amount of heat, thereby enabling to eliminate and simplify such a cooling mechanism. As a result, the number of components other than those of the optical system and noises generated by the cooling mechanism can also be reduced.

In addition, arranging the plurality of light-emitting diodes in consideration of a luminous flux distribution of each light-emitting diode can provide an array light source having a uniform luminous flux distribution. It is preferable to perform a uniform illumination of the reflective liquid crystal panel by using such an array light source.

Moreover, in this embodiment, it is also possible to mutually interchange the blue light, the red light and the green light. However, in order to obtain white color, a green light component occupying about 60 to 80% of visible wavelength range light is required. Therefore, as mentioned above, it is preferable to provide a green light source array separately from blue and red light source arrays. This is also applied to the following embodiments.

Moreover, for the projector of this embodiment, the color separating/combining prism described in Embodiment 4 may also be used. However, in this case, similar to the case shown in Embodiment 4, all polarization directions of blue light, red light and green light entering the color separating/combining prism are the direction of S-polarized light. Therefore, in the projector of this embodiment, conversion of the red light into P-polarized light using the wavelength-selective phase element 63 is not required, thus the red light is entered into the color separating/combining prism as S-polarized light. In other words, it is necessary to remove the wavelength-selective phase element 63.

In addition, it is also necessary to remove the optical member 64 which is provided on the optical path of the green light so as to cause the optical path length of the green light to be equal to those of the blue light and red light. Accordingly, the use of the color separating/combining prism of Embodiment 4 enables to further reduce the number of components of the projector and the cost thereof.

Embodiment 8

Figure 14:
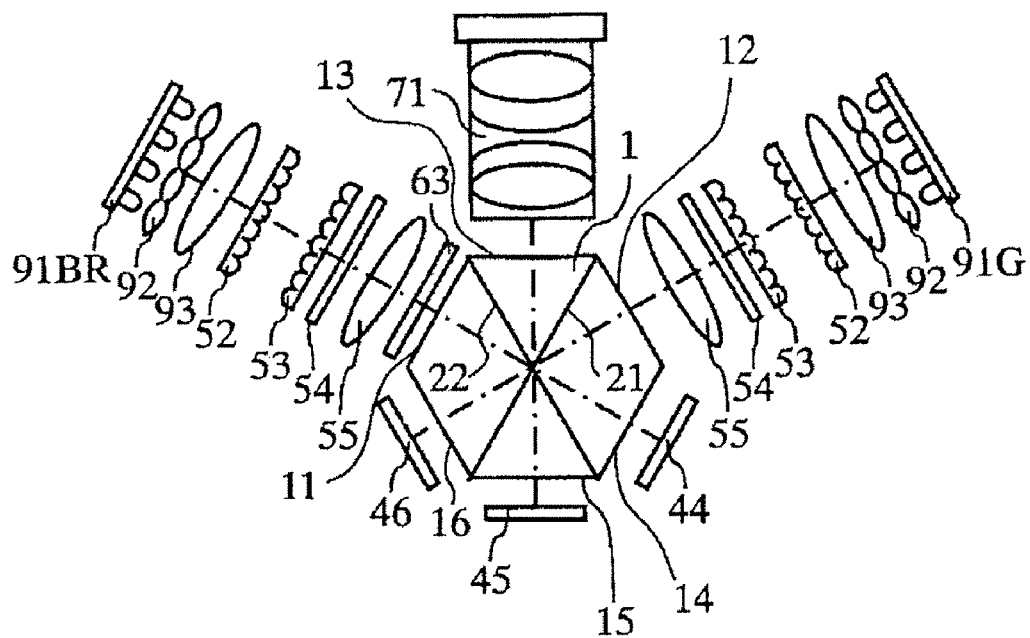
FIG. 14 is a schematic view of a projector that is Embodiment 8 of the present invention.

FIG. 14 shows a schematic configuration of a projector that is Embodiment 8 of the present invention. The projector of this embodiment uses the color separating/combining prism 1 described in Embodiment 1 and the light source arrays 91BR and 91G described in Embodiment 7. Moreover, the same components as those in Embodiments 5 to 7 are denoted by the same reference numerals in Embodiments 5 to 7.

The blue light and the red light emerging from an array light source 91BR enter a lens array 92 which has a plurality of lens cells corresponding to the luminous flux distribution of respective light-emitting diodes. The lens array 92 causes light from respective light-emitting diodes to superposedly enter the entire region of the effective diameter of a collimator lens 93. A parallel luminous flux emerges from the collimator lens 93.

The parallel luminous flux is divided into a plurality of luminous fluxes by a first fly-eye lens 52, and each divided luminous flux is converged. Each of the divided luminous flux is converged near a second fly-eye lens 53 and a polarization conversion element 54, and forms a light source image. The fly-eye lenses 52 and 53 have configurations where a plural lens cells are arranged two-dimensionally. Each lens cell has a rectangular lens shape similar to those of blue and red panels 44 and 45 arranged on a surface to be illuminated.

The polarization conversion element 54 converts non-polarized light emerging from the second fly-eye lens 53 into S-polarized light. The blue light and red light emerging from the polarization conversion element 54 are condensed by a condenser lens 55, and then enter a wavelength-selective phase element 63 which rotates only the polarization direction of the red light by 90°. The blue light emerging from the wavelength-selective phase element 63 as S-polarized light and the red light emerging from the wavelength-selective phase element 63 as P-polarized light enter the color separating/combining prism 1, and superposedly illuminate a blue panel 44 and a red panel 45, respectively.

The actions of the color separating/combining prism 1 are similar to those of Embodiment 3. Therefore, blue image light and red image light emerge outside the color separating/combining prism 1 from the emergence surface 13 thereof, and then enter a projection lens 71 to be projected on a screen.

The wavelength-selective phase element 63 may be provided on the entrance side of the condenser lens 55.

The green light emitted from an array light source 91G enters a lens array 92 which has a plurality of lens cells corresponding to the luminous flux distribution of respective light-emitting diodes. The lens array 92 causes light from each light-emitting diode to superposedly enter the entire region of the effective diameter of a collimator lens 93. From the collimator lens 93, a parallel luminous flux emerges. The parallel luminous flux is divided into a plurality of luminous fluxes by a first fly-eye lens 52, and each divided luminous flux is condensed. Each of the divided luminous flux is condensed near a second fly-eye lens 53 and a polarization conversion element 54, and forms a light source image. The fly-eye lenses 52 and 53 have configurations where plural lens cells are arranged two-dimensionally. Each lens cell has a rectangular lens shape similar to that of green panels 46 arranged on a surface to be illuminated.

The polarization conversion element 54 converts non-polarized light emerging from the second fly-eye lens 53 into S-polarized light. The green light emerging from the polarization conversion element 54 as S-polarized light is condensed by the condenser lens 55, and then enters the color separating/combining prism 1 to superposedly illuminate a green panel 46. The actions of the color separating/combining prism 1 are similar to those of Embodiment 3. Therefore, green image light emerges outside the color separating/combining prism 1 from the emergence surface 13 thereof, and then enters the projection lens 71 to be projected on the screen.

As described above, using array light sources generating light with different wavelengths and one color separating/combining prism 1 of Embodiment 1 can provide a projector which has a reduced number of components and a reduced size.

Moreover, using a lens array 92, a collimator lens 93 and the fly-eye lenses 52 and 53 enables a uniform illumination of each reflective liquid crystal panel. This enables not only to obtain a uniform brightness projection image but also to reduce uneven coloring due to fluctuations of the brightness and wavelength of respective light-emitting diodes.

Moreover, similar to the case of Embodiment 7, a cooling mechanism can be eliminated or simplified, thereby reducing the number of components other than those of the optical system and noises.

Moreover, for the projector of this embodiment, the color separating/combining prism described in Embodiment 4 may also be used. However, in this case, similar to the case shown in Embodiment 4, all polarization directions of blue light, red light and green light entering the color separating/combining prism are the direction of S-polarized light. Therefore, in the projector of this embodiment, conversion of the red light into P-polarized light using the wavelength-selective phase element 63 is not required, thus the red light is entered into the color separating/combining prism as S-polarized light. In other words, it is necessary to remove the wavelength-selective phase element 63.

In addition, it is also necessary to remove the optical member 64 which is provided on the optical path of the green light so as to cause the optical path length of the green light to be equal to those of the blue light and red light. Thereby, the use of the color separating/combining prism of Embodiment 4 enables to further reduce the number of components of the projector and the cost thereof.

Embodiment 9

Figure 15:
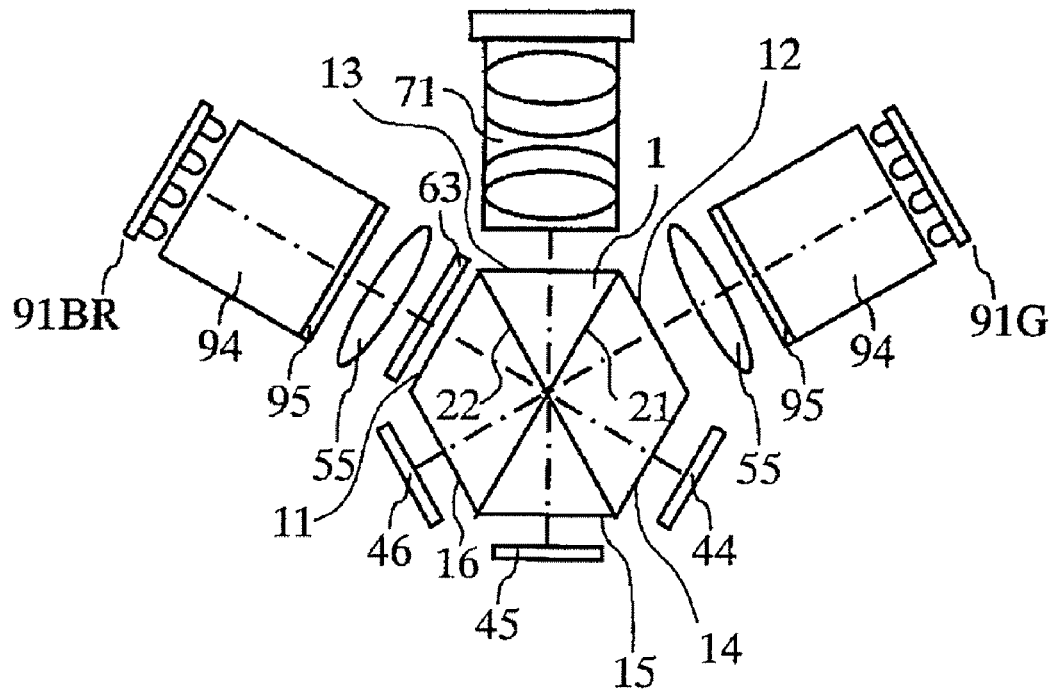
FIG. 15 is a schematic view of a projector that is Embodiment 9 of the present invention.

FIG. 15 shows a schematic configuration of a projector that is Embodiment 9 of the present invention. The projector of this embodiment uses the color separating/combining prism 1 described in Embodiment 1 and the light source arrays 91BR and 91G described in Embodiments 7 and 8. Moreover, the same components as those in Embodiments 5 to 8 are denoted by the same reference numerals in these embodiments.

The blue light and red light emerging from an array light source 91BR enter a rod lens 94. The rod lens 94 causes a plurality numbers of luminous fluxes entering from the entrance surface thereof to totally reflect at the inner wall or outer wall thereof, and thereby they emerge therefrom as a uniform luminous flux. The luminous flux emerging from the rod lens 94 enters a reflective polarizer 95 disposed on the emergence surface of the rod lens 94. The reflective polarizer 95 transmits S-polarized light and reflects P-polarized light. Therefore, the light emerging from the reflective polarizer 95 becomes S-polarized light.

The P-polarized light reflected by the reflective polarizer 95 enters the rod lens 94 again and is repeatedly reflected inside the rod lens 94. The repetition of reflection rotates the polarization direction of the P-polarized light, and finally the P-polarized light is emerged from the reflective polarizer 95 as S-polarized light. In addition, in place of the reflective polarizer 95, a polarization conversion element may be used which converts non-polarized light into S-polarized light.

The blue light and red light emerging from the reflective polarizer 95 that are S-polarized light are condensed by a condenser lens 55, and only the polarization direction of the red light is rotated by 90° by a wavelength-selective phase element 63. The blue light emerging from the wavelength-selective phase element 63 as S-polarized light and the red light emerging from the wavelength-selective phase element 63 as P-polarized light enter the color separating/combining prism 1 to superposedly illuminate a blue panel 44 and a red panel 45, respectively. The actions of the color separating/combining prism 1 are similar to those of Embodiment 3. Therefore, blue image light and red image light emerge outside the color separating/combining prism 1 from the emergence surface 13 thereof, and then enter a projection lens 71 to be projected on a screen.

The wavelength-selective phase element 63 may be provided at the entrance side of the condenser lens 55.

The green light emitted from an array light source 91G enters a rod lens 94 and a reflective polarizer 95 having a function similar to those for the blue light and red light, and emerges from the reflective polarizer 95 as S-polarized light. In place of the reflective polarizer 95, a polarization conversion element may be used which converts non-polarized light into S-polarized light.

The green light emerging from the reflective polarizer 95 is condensed by the condenser lens 55, and enters the color separating/combining prism 1 to superposedly illuminate a green panel 46. The actions of the color separating/combining prism 1 are similar to those of Embodiment 3. Therefore, green image light emerges outside the color separating/combining prism 1 from the emergence surface 13 thereof, and then enters a projection lens 71 to be projected on a screen.

As described above, using array light sources generating light with different wavelengths and the color separating/combining prism of Embodiment 1 can achieve a projector which has a reduced number of components and a reduced size. Moreover, using the rod lens 94 can perform a uniform illumination of each reflective liquid crystal panel. This enables not only to obtain a uniform brightness projection image but also to reduce uneven coloring due to fluctuations of the brightness and wavelength of respective light-emitting diodes.

Moreover, similar to the case of Embodiment 6, a cooling mechanism can be eliminated or simplified, so that the number of components other than those of the optical system and noises can be reduced.

Moreover, as the projector of this embodiment, the color separating/combining prism described in Embodiment 4 may also be used. However, in this case, similar to the case shown in Embodiment 4, all polarization directions of blue light, red light and green light entering the color separating/combining prism are the direction of S-polarized light. Therefore, in the projector of this embodiment, conversion of the red light into P-polarized light using the wavelength-selective phase element 63 is not required, and red light is entered into the color separating/combining prism as S-polarized light. In other words, it is necessary to remove the wavelength-selective phase element 63.

In addition, it is also necessary to remove the optical member 64 which is provided on the optical path of the green light so as to cause the optical path length of the green light to be equal to those of the blue light and red light. Therefore, the use of the color separating/combining prism of Embodiment 4 enables to further reduce the number of components of the projector and the cost thereof.

As described above, according to the above-mentioned embodiments, utilizing attenuated total reflection enables to obtain a multilayer film with an antireflection function which transmits S-polarized light impinging thereon at an incident angle of 60°, reflects P-polarized light impinging thereon at an incident angle of 60° and transmits a ray whose incident angle is 0°.

Moreover, according to above-mentioned embodiments, utilizing attenuated total reflection and using a specific film configuration enable to obtain a multilayer film having a function to transmit a ray impinging thereon at a specific incident angle in a first wavelength range. Further, the multilayer film also has a polarization splitting function in which the transmittance for P-polarized light in a second wavelength range impinging thereon at another incident angle is higher than that for S-polarized light in the second wavelength range impinging thereon at the other incident angle, and the transmittance for S-polarized light in a third wavelength range impinging thereon at the other incident angle is higher than that for P-polarized light in the third wavelength range impinging thereon at the other incident angle.

In addition to this, in a color separation/combination optical system using a reflective image-forming element, using a hexagonal pillar-based color separating/combining prism in which the multilayer film is provided can shorten the back focus of the projection lens and achieve miniaturization of the projection lens. And, this enables to reduce the number of components of the projector and the entire size thereof. In particular, using a light source array can achieve a projector whose size is much smaller than conventional projectors using a light source lamp.

In addition, although, in the above embodiments, optical elements having a hexagonal pillar-based prism phase has been described, optical elements as alternative embodiments of the present invention are not limited thereof, and they can be formed in various shapes.

Furthermore, the present invention is not limited to these preferred embodiments and various variations and modifications may be made without departing from the scope of the present invention.

This application claims foreign priority benefits based on Japanese Patent Applications Nos. 2006-168106, filed on Jun. 16, 2006, and 2007-150000, filed on Jun. 6, 2007, and each of which is hereby incorporated by reference herein in its entirety as if fully set forth herein.

TABLE 1

|  | EMBODIMENT 1 | | EMBODIMENT 2 | | EMBODIMENT 3 | |
| --- | --- | --- | --- | --- | --- | --- |
| Prism | SF6 | | SF6 | | SF6 | |
| H LAYER | TiO2 | | TiO2 | | TiO2 | |
| L LAYER | SiO2 | | SiO2 | | SiO2 | |
| AR INCIDENT ANGLE | 0 ± 2° | | 15 ± 2° | | 15 ± 2° | |
| PBS INCIDENT ANGLE | 60 ± 2° | | 55 ± 2° | | 65 ± 2° | |
| NUMBER OF LAYER | 37 | | 37 | | 25 | |
|  | MATERIAL | THICKNESS | MATERIAL | THICKNESS | MATERIAL | THICKNESS |
| 1 | L | 31.45 | L | 28.94 | L | 6.99 |
| 2 | H | 16.57 | H | 19.2 | H | 9.41 |
| 3 | L | 64.94 | L | 61.21 | L | 43.68 |
| 4 | H | 16.46 | H | 18.89 | H | 18.95 |

TABLE 1-continued

| | | | | | | |
|---|---|---|---|---|---|---|
| 5 | L | 78.76 | L | 76.23 | L | 59.25 |
| 6 | H | 15.56 | H | 17.4 | H | 19.7 |
| 7 | L | 81.99 | L | 82.56 | L | 65.01 |
| 8 | H | 14.04 | H | 15.31 | H | 19.59 |
| 9 | L | 92.66 | L | 91.93 | L | 71.98 |
| 10 | H | 12.99 | H | 14.86 | H | 18.88 |
| 11 | L | 87.26 | L | 89.09 | L | 71.81 |
| 12 | H | 13.28 | H | 14.41 | H | 18.3 |
| 13 | L | 96.98 | L | 95.67 | L | 76.83 |
| 14 | H | 11.55 | H | 14.03 | H | 18.17 |
| 15 | L | 91.85 | L | 91.69 | L | 72.4 |
| 16 | H | 13.41 | H | 14.5 | H | 17.52 |
| 17 | L | 92.59 | L | 94.39 | L | 76.65 |
| 18 | H | 11.21 | H | 14.18 | H | 17.05 |
| 19 | L | 99.51 | L | 92.26 | L | 70.42 |
| 20 | H | 12.95 | H | 15.17 | H | 16.35 |
| 21 | L | 86.01 | L | 90.15 | L | 70.75 |
| 22 | H | 12.34 | H | 16.12 | H | 14.54 |
| 23 | L | 104.15 | L | 84.79 | L | 55.75 |
| 24 | H | 11.53 | H | 18.85 | H | 9.59 |
| 25 | L | 85.7 | L | 72.65 | L | 15.27 |
| 26 | H | 13.83 | H | 25.09 | PVCz | |
| 27 | L | 97.07 | L | 53.18 | — | — |
| 28 | H | 11.15 | H | 35.05 | — | — |
| 29 | L | 90.35 | L | 38.6 | — | — |
| 30 | H | 14.25 | H | 38.8 | — | — |
| 31 | L | 85.65 | L | 41.96 | — | — |
| 32 | H | 12.71 | H | 31.29 | — | — |
| 33 | L | 89.13 | L | 52.66 | — | — |
| 34 | H | 13.8 | H | 23.18 | — | — |
| 35 | L | 72.39 | L | 56.07 | — | — |
| 36 | H | 13.43 | H | 15.63 | — | — |
| 37 | L | 43.47 | L | 18.03 | — | — |
| 38 | PVCz | | PVCz | | — | — |

TABLE 2

| | EMBODIMENT 4 MULTI LAYER FILM2 |
|---|---|
| Prism | S-LAH55 |
| H LAYER | TiO2 |
| L LAYER | SiO2 |
| G-AR INCIDENT ANGLE | 0 ± 2° |
| BR-AR INCIDENT ANGLE | 60 ± 2° |
| NUMBER OF LAYER | 46 |

| | MATERIAL | THICKNESS |
|---|---|---|
| 1 | H | 36.76 |
| 2 | L | 42.63 |
| 3 | H | 44.87 |
| 4 | L | 66.74 |
| 5 | H | 37.07 |
| 6 | L | 60.06 |
| 7 | H | 49.26 |
| 8 | L | 67.64 |
| 9 | H | 30.52 |
| 10 | L | 81.97 |
| 11 | H | 26.01 |
| 12 | L | 80.63 |
| 13 | H | 44.97 |
| 14 | L | 50.45 |
| 15 | H | 38.43 |
| 16 | L | 85.18 |
| 17 | H | 27.45 |
| 18 | L | 105.35 |
| 19 | H | 38.26 |
| 20 | L | 51.89 |
| 21 | H | 49.59 |
| 22 | L | 79 |
| 23 | H | 29.93 |
| 24 | L | 108.85 |
| 25 | H | 36.55 |
| 26 | L | 45.53 |
| 27 | H | 64.37 |
| 28 | L | 61.14 |
| 29 | H | 31.23 |
| 30 | L | 52.23 |
| 31 | H | 19.7 |
| 32 | L | 30.76 |
| 33 | H | 65.12 |
| 34 | L | 39.51 |
| 35 | H | 38.74 |
| 36 | L | 90.69 |
| 37 | H | 43.77 |
| 38 | L | 33.61 |
| 39 | H | 76.32 |
| 40 | L | 58.37 |
| 41 | H | 43.23 |
| 42 | L | 42.4 |
| 43 | H | 66.65 |
| 44 | L | 50.62 |
| 45 | H | 30.25 |
| 46 | L | 38.11 |
| | PVCz | |

What is claimed is:

1. An optical element comprising:

first and second entrance surfaces through each of which light enters the optical element;

one emergence surface from which light emerges;

three transmissive surfaces each of which faces a reflective image-forming element; and a first optical structure formed along a first plane and a second optical structure formed along a second plane, the first and second planes intersecting each other inside the optical element;

wherein all normals to the first and second entrance surfaces, the one emergence surface, the three transmissive surfaces and the first and second planes are parallel to a same plane, wherein the following condition is satisfied:

$45° < \theta_0 < 75°$ where $\theta_0$ is a smaller one of angles made by the first and second planes, wherein an angle made by normals to the first entrance surface and the first plane is $\theta_1$,
wherein an angle made by normals to the first entrance surface and the second plane is $\theta_2$,
wherein an angle made by normals to the second entrance surface and the first plane is $\theta_3$,
wherein an angle made by normals to the second entrance surface and the second plane is $\theta_4$, and
wherein $\theta_1$ is equal to $\theta_4$ and $\theta_2$ is equal to $\theta_3$.

2. The optical element according to claim 1, wherein the first and second entrance surfaces, the one emergence surface and the three transmissive surfaces are arranged on six planes other than both hexagonal end planes in a three dimensional shape defined as a hexagonal pillar whose all internal angles are greater than 90°.

3. The optical element according to claim 1, wherein
two surfaces neighboring the emergence surface are the first and second entrance surfaces; and
three surfaces opposite to the emergence surface and the first and second entrance surfaces are the three transmissive surfaces.

4. An image projection apparatus comprising:
three reflective image-forming elements;
an optical element according to claim 1 which combines light from the three reflective image-forming elements; and
a projection system which projects light emerging from the optical element onto a projection surface.

* * * * *